United States Patent
Gordin et al.

(10) Patent No.: US 9,706,622 B2
(45) Date of Patent: Jul. 11, 2017

(54) SPORTS LIGHTING TO INCREASE CONTRAST OF AN AERIAL SPORTS OBJECT RELATIVE TO BACKGROUND

(71) Applicant: Musco Corporation, Oskaloosa, IA (US)

(72) Inventors: Myron Gordin, Oskaloosa, IA (US); David L. Barker, Ottumwa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 14/712,485

(22) Filed: May 14, 2015

(65) Prior Publication Data
US 2015/0334807 A1 Nov. 19, 2015

Related U.S. Application Data

(60) Provisional application No. 61/994,473, filed on May 16, 2014.

(51) Int. Cl.
| | |
|---|---|
| *F21S 4/00* | (2016.01) |
| *H05B 37/02* | (2006.01) |
| *F21V 23/04* | (2006.01) |
| *F21W 131/105* | (2006.01) |

(52) U.S. Cl.
CPC ..... *H05B 37/0218* (2013.01); *F21V 23/0464* (2013.01); *H05B 37/0281* (2013.01); *F21W 2131/105* (2013.01)

(58) Field of Classification Search
CPC ... F21K 9/58; F21Y 2101/02; H05B 37/0218; H05B 37/081; H05B 37/0227; H05B 37/0857; F21V 23/0464
See application file for complete search history.

(56) References Cited

U.S. PATENT DOCUMENTS

| | | |
|---|---|---|
| 5,443,260 A | 8/1995 | Stewart et al. |
| 7,444,770 B2 | 11/2008 | Wellington, Jr. |
| 2003/0027655 A1 | 2/2003 | Lutz et al. |

(Continued)

FOREIGN PATENT DOCUMENTS

| | | | |
|---|---|---|---|
| JP | 06084403 A | * | 3/1994 |
| JP | H0684403 A | | 3/1994 |

OTHER PUBLICATIONS

LEDs Magazine, Instant-on benefit of LED low-bay lighting maximizes energy savings for school, Dec. 12, 2013, p. 1.*

(Continued)

*Primary Examiner* — Tung X Le
*Assistant Examiner* — Raymond R Chai
(74) *Attorney, Agent, or Firm* — McKee, Voorhees & Sease, PLC

(57) ABSTRACT

Apparatus, method, and system for improving visibility of objects against a background. Background luminance is monitored for an event or condition. Upon sensing of the event or condition, uplighting is provided for one or more areas above a target area at a time and in a manner which increases visibility of the object against the background. In one example, the objects are sports balls and the background is sky, stadium, or sports field. Time and manner can include detection of an event indicative of a ball being in play or transition between daylight and nighttime, manner can include amount, color, or direction of up light.

25 Claims, 24 Drawing Sheets

(56) References Cited

U.S. PATENT DOCUMENTS

2008/0316743 A1 12/2008 Shaneour
2013/0243248 A1 9/2013 Vonolfen et al.
2013/0250556 A1 9/2013 Gordin et al.

OTHER PUBLICATIONS

Masanori Shimizu, "Illuminating Device for Baseball Field", Mar. 25, 1994, Japanese Patent Doucment, Translated by: Phoenix Tranlastions, 100 N. Avenue B Elgin, TX 78621.*
Kipo, "ISR & WO of the International Searching Authority" for PCT/US2015/030849, filed on May 14, 2015; Mailed Aug. 13, 2015, 5 Pages.
Newman, "MLBAM Introduces New Way to Analyze Every Play", MLB Advanced Media, (2014), 2 pages, Mar. 1, 2014.
Machine Translation of JPH0684403, Matsushita Electric Ind Co Ltd.

* cited by examiner

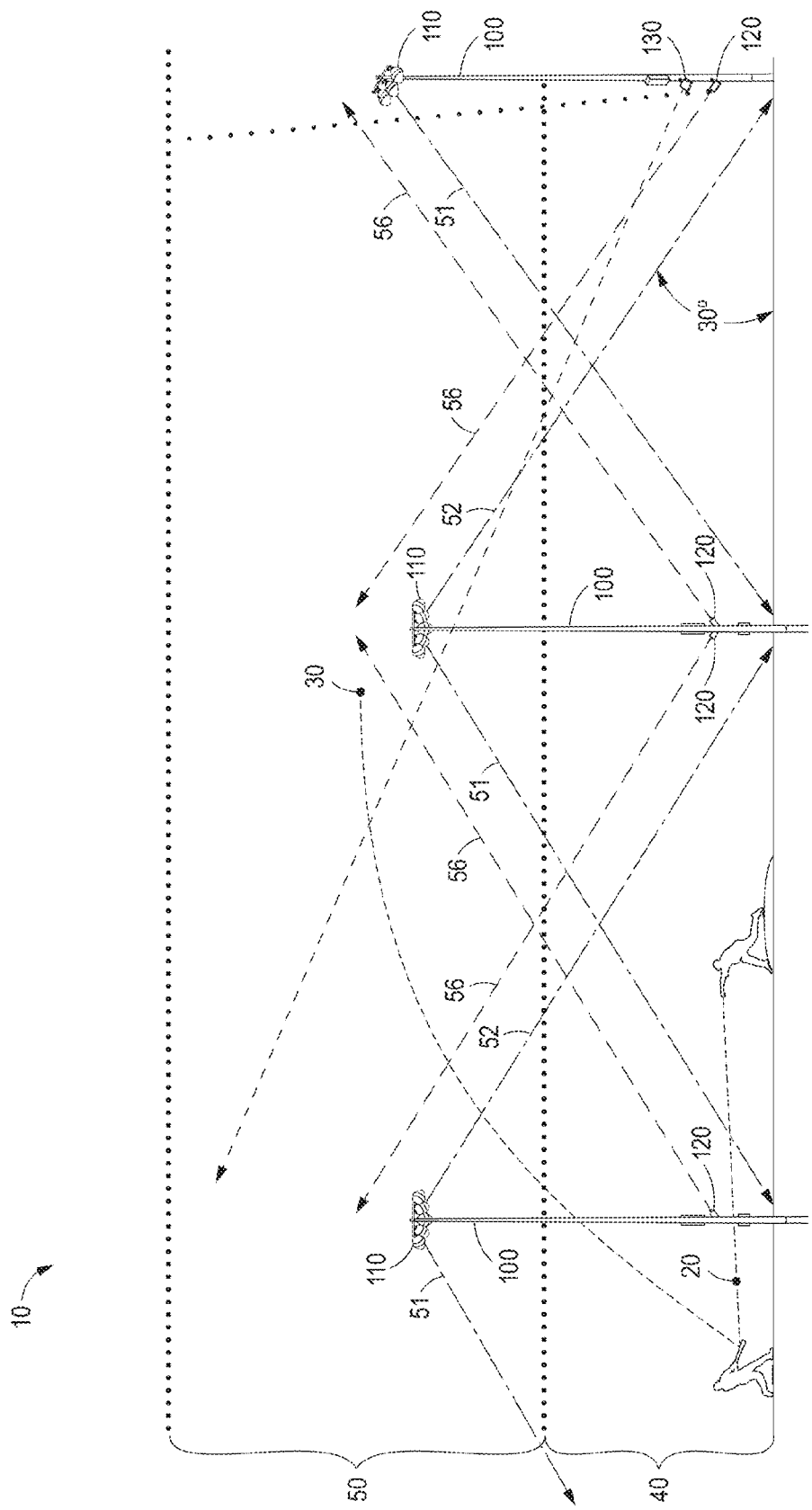

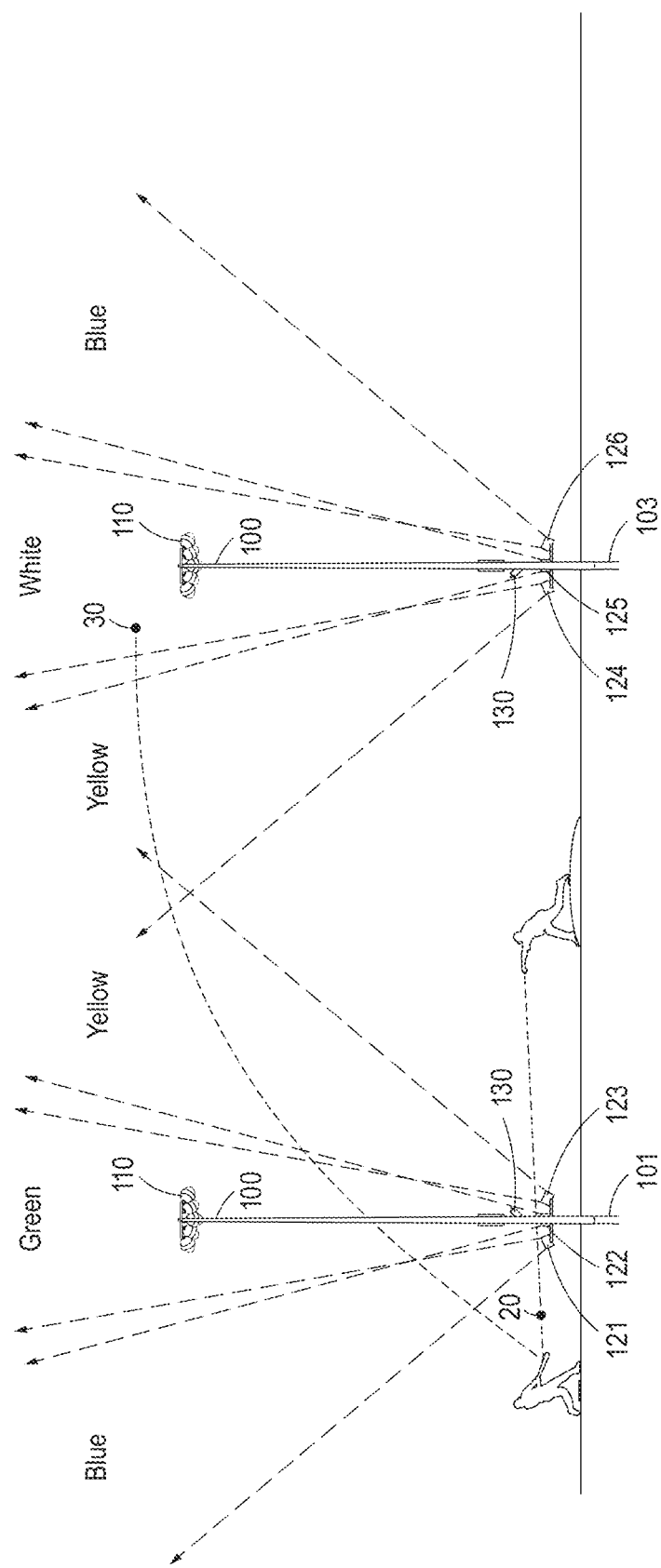

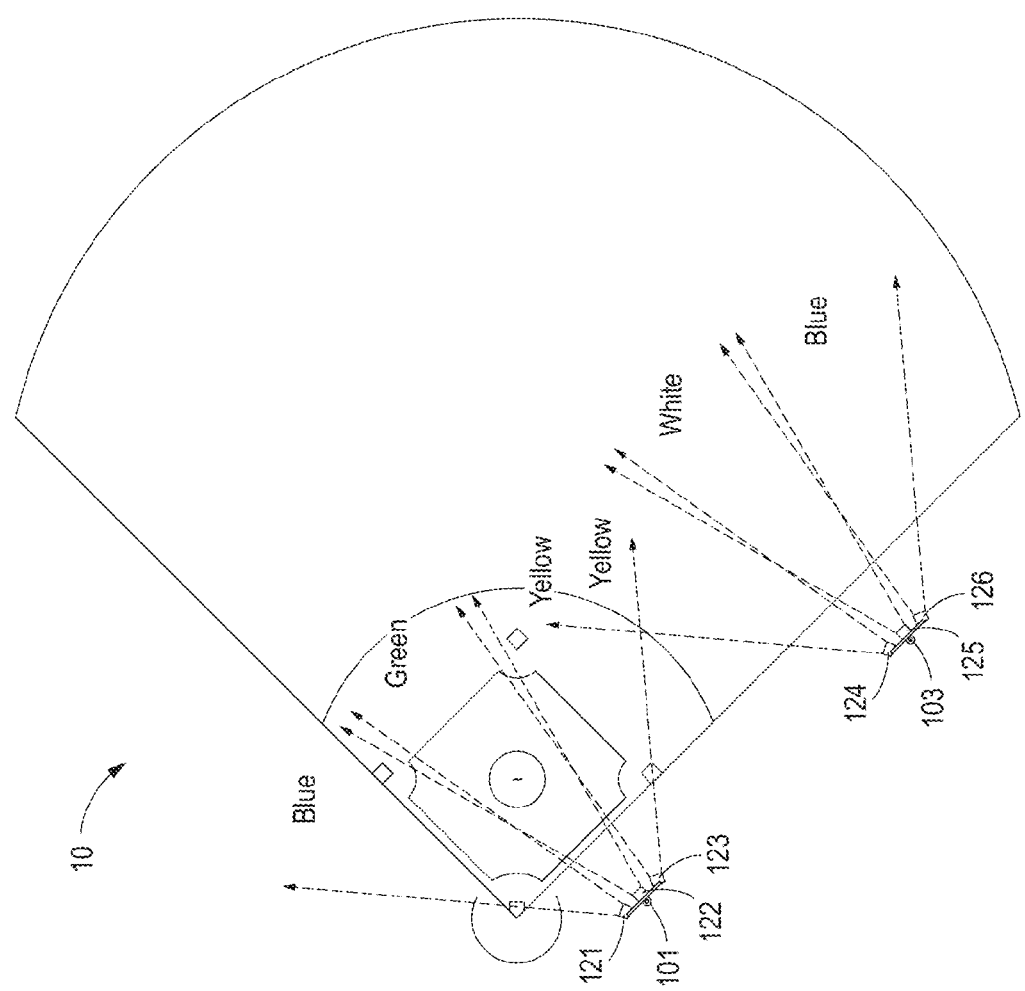

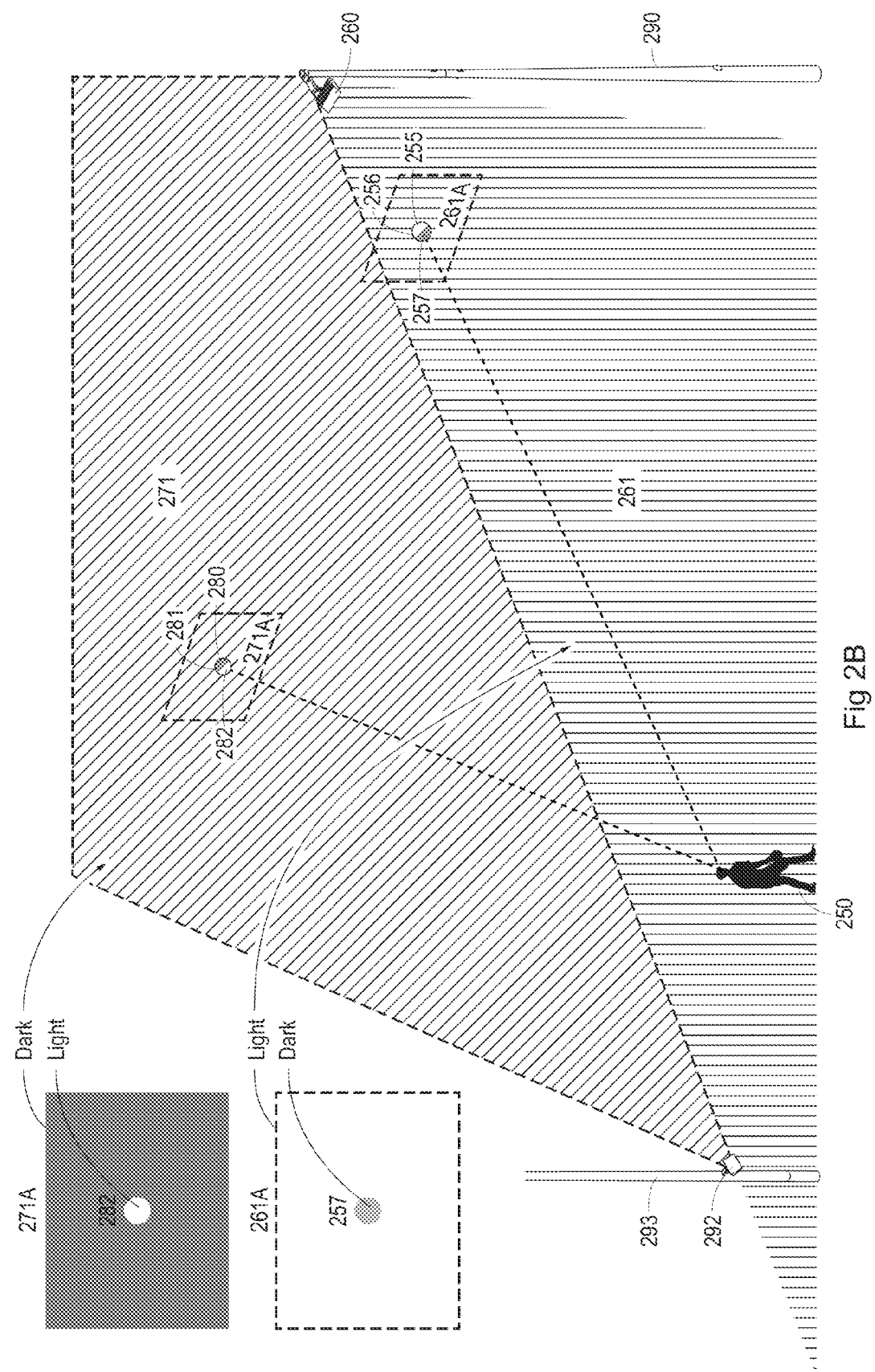

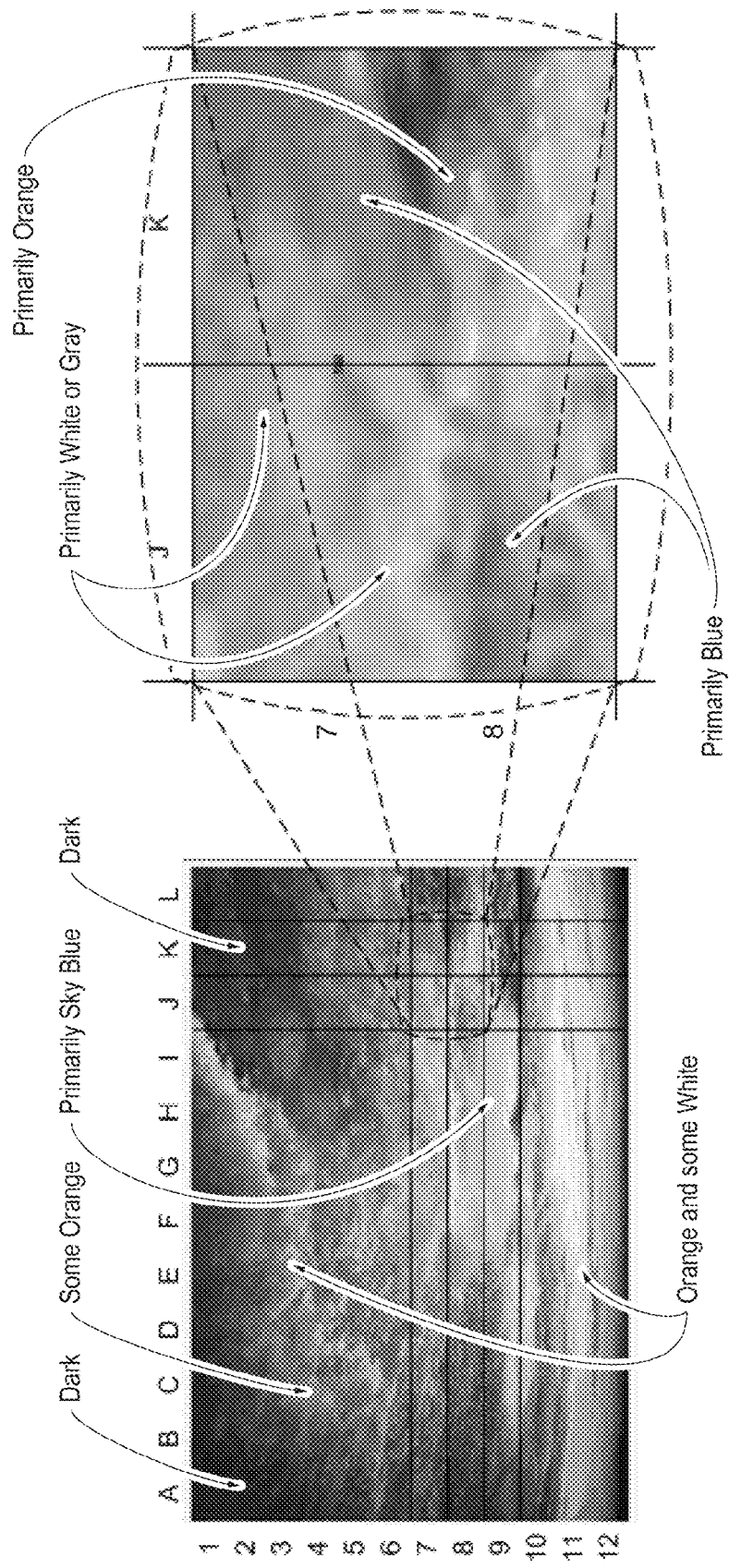

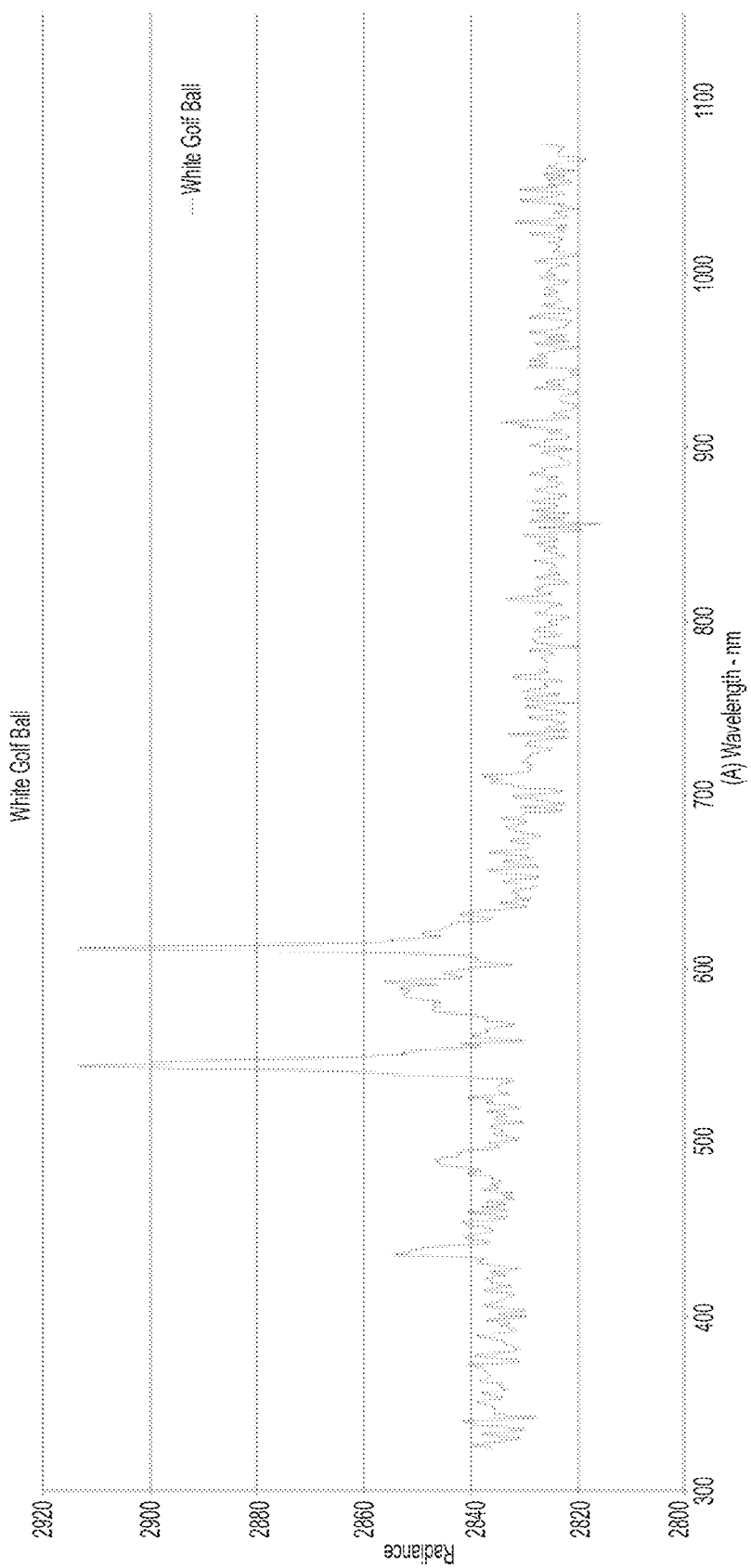

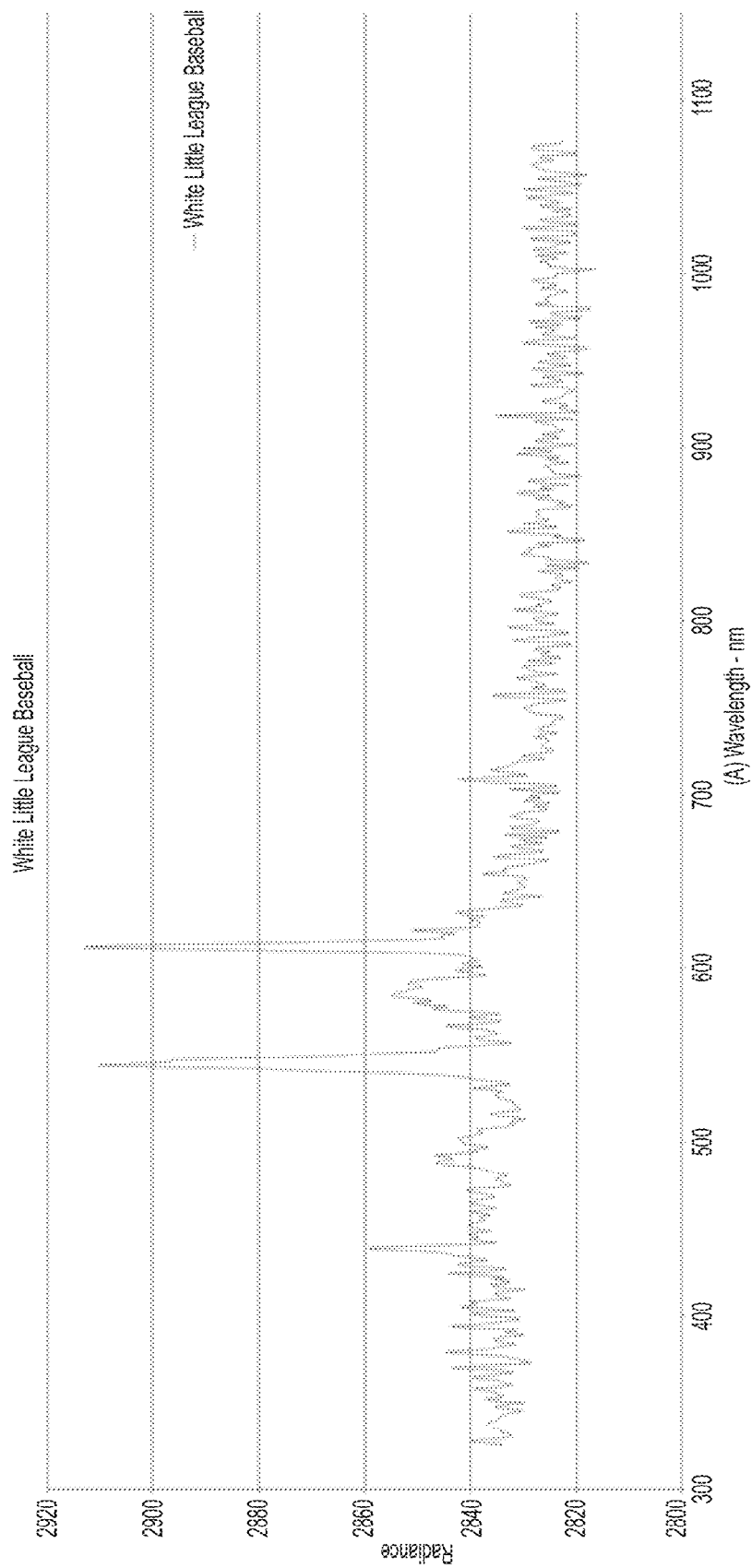

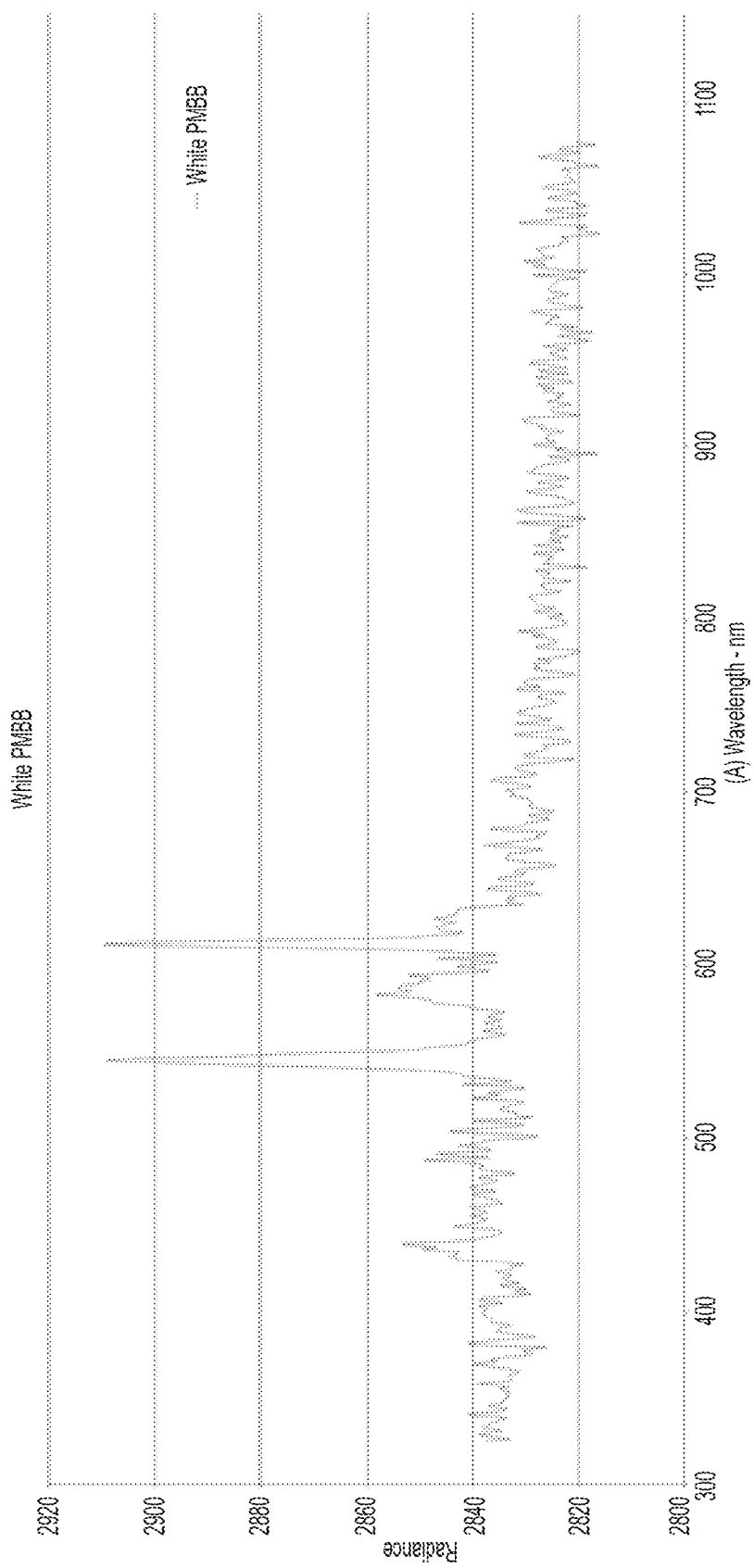

SPORTS LIGHTING TO INCREASE CONTRAST OF AN AERIAL SPORTS OBJECT RELATIVE TO BACKGROUND

CROSS REFERENCE TO RELATED APPLICATIONS

This application claims priority under 35 U.S.C. §119 to provisional applications U.S. Ser. No. 61/994,473 filed May 16, 2014, herein incorporated by reference in its entirety.

I. BACKGROUND OF THE INVENTION

Field of Invention

The present invention relates to wide area lighting systems which utilize a plurality of light fixtures for aerial lighting. In particular, the invention relates to methods and apparatus to provide direct illumination on aerial objects or to a volume of aerial space, to monitor chromatic and luminance contrast of the sky and provide either an illuminance of contrasting color or no illuminance to provide the spectral distribution that will provide the most contrast between an object such as a sports ball (e.g. baseball, softball, golf ball) and its background, including but not limited to a softball against the twilight sky and a golf ball against green grass, including the use of UV or near UV light and/or UV activated ink, paint, or other colorant to improve contrast and visibility of a ball, to control the direction and intensity of light to reduce glare for viewers within the target area, and to reduce glare and spill light outside the target area.

Background of Invention

Optimizing visibility of sports balls, with specific attention given to optimizing contrast of sports balls with reference to their backgrounds, is a matter of considerable discussion in the art. Wellington, in U.S. Pat. No. 7,444,770, which is incorporated by reference, discusses this and cites several references to industry studies. For purposes of this application, "optimizing" visibility and contrast refers to techniques, methods, etc. that improve visual acquisition, recognition, differentiation, or tracking of an object such as a ball in flight.

Baseball or softball games often will begin during late afternoon when lighting is good, and continue through twilight and into nighttime hours. This presents a challenge for lighting during the twilight transition, since during sunset lighting conditions change dramatically. Just prior to and after sunset, there is a period of time when there is very little, if any, contrast between the sky and the ball. During the day, the sky typically will be quite bright, so that an airborne ball viewed from below will appear dark in comparison to the sky. This means that there is sufficient contrast to easily see the ball. Likewise, when the sun has fully set and the sky is dark, it does not take much illuminance on a ball in the air in order for the ball to have a sufficient luminance against the dark sky, so that again, there is sufficient contrast to see the ball. However, at some point during the transition from daylight to night, the ball and the sky will have nearly the same luminance, and often the color of the ball provides little chromatic contrast against the sky resulting in very little visual contrast. This makes the ball more difficult to see, reducing "playability." Unfortunately, because of factors that will be outlined below, the use of aerial lighting during this transitional period may not always help, and sometimes may even cause a reduction in the visual contrast.

The sky during a typical sunset will have areas of high luminance that, though greatly reduced from daylight brightness, is still much brighter than the light that can be provided by artificial aerial lighting. Some areas will have a luminance approximately equal to the luminance that can be provided by aerial lighting. There will also be areas of low luminance that are close to night time levels. Colors may range from indigo and blue, to yellow, orange, rose, and pink, all within a single sunset. For best visual contrast, these different areas would require lighting that ranges from intense white in the darkest areas, to red, blue, green, or many other possible combinations of color in order to contrast with the colored background. But most sports field lighting operates as if there are only two sky conditions: day and night. Lights, which include both field lights and aerial lighting, can be off or on, but there is no ability to compensate for the twilight transition. And in most cases, since aerial lighting is often provided by directing light from the field lighting luminaires upwardly, as seen in FIG. 1B, where a single pole with lights is illustrated (typically there are plural such poles and lights), turning on the field lights automatically turns on the aerial lighting as well. This means that for some conditions (e.g. where aerial lighting is provided by the same source as field lighting), early twilight field lighting is detrimental to aerial visibility, but for other conditions later twilight field lighting is equally detrimental, since in both cases contrast, and therefore playability, can be reduced by providing the wrong lighting level.

FIGS. 1A and 1B show a simplified version of baseball field 10 with multiple light fixtures 110 on each pole 100, FIG. 1B with only one light pole shown for clarity. Real-world installations would have many poles and luminaires (e.g. see FIG. 1A), but the principles are the same as illustrated herein. Field lights 110 on pole 100 at field 10, FIG. 1B, provide field lighting in the areas between exemplary rays 51 and 52. This provides illumination of ball 20 when in the "ground zone" 40. Lights 110 also direct some light in the area between rays 52 and 53. This provides some useful illumination on ball 30 in the "fly zone" 50, but also directs unwanted light as exemplified by ray 54 towards off-field object 55, which could be a residential building, office, or other location which is harmed or adversely affected by having unwanted light illuminating the object. It can be appreciated then that using field lights mounted on a high pole to direct light in a broad angle that illuminates the fly zone, will of necessity direct some light off the field in an undesired direction, resulting in unwanted light on neighboring properties. So a better or alternative solution is needed or beneficial for at least some cases.

Another issue is the desire to save money in the operation of sports lighting. Since lighting a large sports field consumes a lot of electrical power, it is advantageous to reduce the number of hours of operation of a sports field lighting system. For instance, for a game anticipated to require 2.5 hours of lighting, delaying lighting operation by 15 minutes, by means of more precisely predicting the time when additional or alternative uplighting will contribute to playability, would reduce power usage for the evening by an estimated 10% which can result in significant savings. Even for a 5 hour period, delaying the start of aerial lighting by 15 minutes would generate a savings of 5%. In order to accomplish this "daylight harvesting," lights may be turned on a set number of minutes before sunset. Or, a photocell or other sensor may be used to turn on lights in response to reduced light from the sky. However, since lighting conditions at sunset are not consistent, even though sunset time is known, there are some problems associated with this approach, since neither methodology necessarily ensures that aerial lighting will be turned on at the correct time for all sky conditions. Therefore, the aerial lighting might still be turned on too early, which could reduce rather than enhance visual contrast. Or the aerial lighting might be turned on too late for optimal contrast under some conditions.

Another problem with using field lights as a source of aerial lighting, assuming the use of HID lighting technology, is the fact that conventional HID lamps require several minutes of warm-up when turned on before they can effectively provide light, and once turned off require a cooling-off period before they can be re-lit. This means that to allow for adequate warm-up time, the lights normally need to be turned on before they are needed so that they will be on when needed. Also, they can't be turned off when not needed, since with changing conditions they could be needed before it is possible to get them turned on and warmed up in time.

Still another problem with this method is that it doesn't compensate for color. There is no known way to pre-program colored lights to match light conditions that can change not only daily, but even minute-by-minute. For example, it might seem to make sense to add illumination that has a spectral distribution that is weighted more towards blue wavelengths, since twilight illumination in the vicinity of the setting sun can be reddish in color. However most of the sky tends to remain blue even as the sun is setting, and therefore some sky conditions would benefit by adding yellow, rather than blue light. Under those conditions, adding blue light would reduce rather than improve contrast. So attempting to pre-define a color scheme for twilight lighting is likely to be difficult if not impossible.

There is therefore room for improvement in the art.

II. SUMMARY OF THE INVENTION

A method, system, and apparatus is envisioned for improved visibility of balls in play in the air in sports, including baseball, football, and golf, wherein sky luminance and color is monitored and lights having a specific intensity and color are energized individually or independently in order to provide optimized contrast for changing twilight conditions. This can be accomplished using light fixtures with multiple colored LEDs to provide illumination on objects such as a baseball, softball or golf ball that optimizes the ball's contrast against changing lighting conditions in the sky or on the ground.

One aspect of the invention comprises a lighting system for a target area, the lighting system including a plurality of lighting fixtures configured and aimed to illuminate the target area in at least a space above the target area, one or more lighting fixtures capable of supplying up light over the target area, at least one sensor for sensing the occurrence of an event or condition related to playability at the target area, a circuit that monitors the sensor and upon detection of the event or condition instructs the lighting fixtures to produce the uplighting for a predetermined time period. The event or condition can be related to such things as level of background luminance or an event related to activity at the target area. One event or condition related to background luminance is transitioned between daylight and nighttime. One event or condition related to activity on the target area is flight of a ball. The predetermined time period can be preset in duration or terminate on detection of a subsequent event or condition.

A further aspect of the invention comprises a method of lighting which improves contrast of a sports ball with the sky, for a sports ball in play in the air, by holding off uplighting until it is determined that uplighting will improve contrast.

A further aspect of the invention comprises a method of lighting which improves contrast of a sports ball with the sky, for a sports ball in play in the air, by turning on uplighting when it is determined that uplighting will improve contrast of the ball with the sky.

A further system and apparatus according to aspects of the invention comprises one or more light sensors which sense sky color and illumination; a controller with inputs, outputs, and a control program; and LED luminaires capable of illuminating a specific zone in the sky to provide light on a ball in flight that contrasts well with the twilight or nighttime sky.

A further method, system, and apparatus according to aspects of the invention comprises a lighting system as described above, with an apparatus for triggering aerial lighting using radar, sound, or other methods when a ball goes into play in the air such as e.g. when a batter hits a pitched ball.

A further method comprises using radar or other methods to predict ball velocity and trajectory, or to report ball velocity or trajectory in real time, so that the aerial lighting color and intensity can be modulated for optimum contrast for the player or others who are trying to observe, follow, or catch the ball. If the sky has a mixture of luminance levels or colors, knowing the flight direction of the ball will allow the aerial lighting to be optimized based on the perspective of the outfielders which the ball's flight path indicates have the greatest need to be able to track the ball.

A further method comprises of providing illumination that is near UV (around 400-420 nm) or UVA (400-315 nm), wherein sports balls such as baseballs, softballs, golf balls, etc. fluoresce when exposed to these light wavelengths (as a result of purposefully applied near-UV- or UV-fluorescent dyes or colorings being applied, or from fluorescent characteristics of these objects which are intentionally or naturally present). The result is a "glow" effect which provides higher visibility of the ball under low illumination levels common to night time sports. This effect could be utilized not only for aerial lighting, but also for field lighting in order to improve contrast of the ball with the field, grass, etc.

A further method comprises adding a "flicker" effect to aerial lighting by modulating intensity of the illumination, such that contrast of the ball against its background and visibility of the ball is improved. This can include modulating both visible and UV or near-UV illumination.

A beneficial aspects of the invention as envisioned is improved visual contrast for airborne balls, resulting in improved sports play in twilight hours or other times. Improved contrast can also result in better visibility for a given amount of light, or having the same visibility for a reduced amount of light. This could result in saving energy and money for the user. A further benefit includes the ability to turn on aerial lighting only when needed, which can also result in energy savings. A further benefit is the ability to turn on aerial lighting without necessarily turning on downlighting. A further benefit is the ability to manage aerial lighting to avoid turning on aerial lighting when its use would reduce visual contrast or playability. A yet another benefit is the ability to use one or a low number of distinct aerial lighting zones to provide aerial lighting that is optimized for sky conditions that are characteristic of a larger number of smaller sky zones, by providing aerial lighting that varies over time according to movement of the ball through the air relative the background and observers.

III. BRIEF DESCRIPTION OF THE DRAWINGS

FIG. 1A-F illustrate a sports field having field lights and aerial lighting according to aspects of the present invention.

FIG. 2A-B diagrammatically illustrate instances of balls with varying degrees of contrast with sky backgrounds of different colors and intensities.

FIG. 2C-D illustrate an example of a colored sky background.

FIG. 2E-F illustrate instances of images showing various levels of contrast of balls of FIGS. 2A-B with a colored sky like FIGS. 2C-D.

FIG. 3 diagrammatically illustrates a method according to aspects of the present invention.

FIG. 4 diagrammatically illustrates a system and apparatus according to aspects of the present invention.

Figure 7:
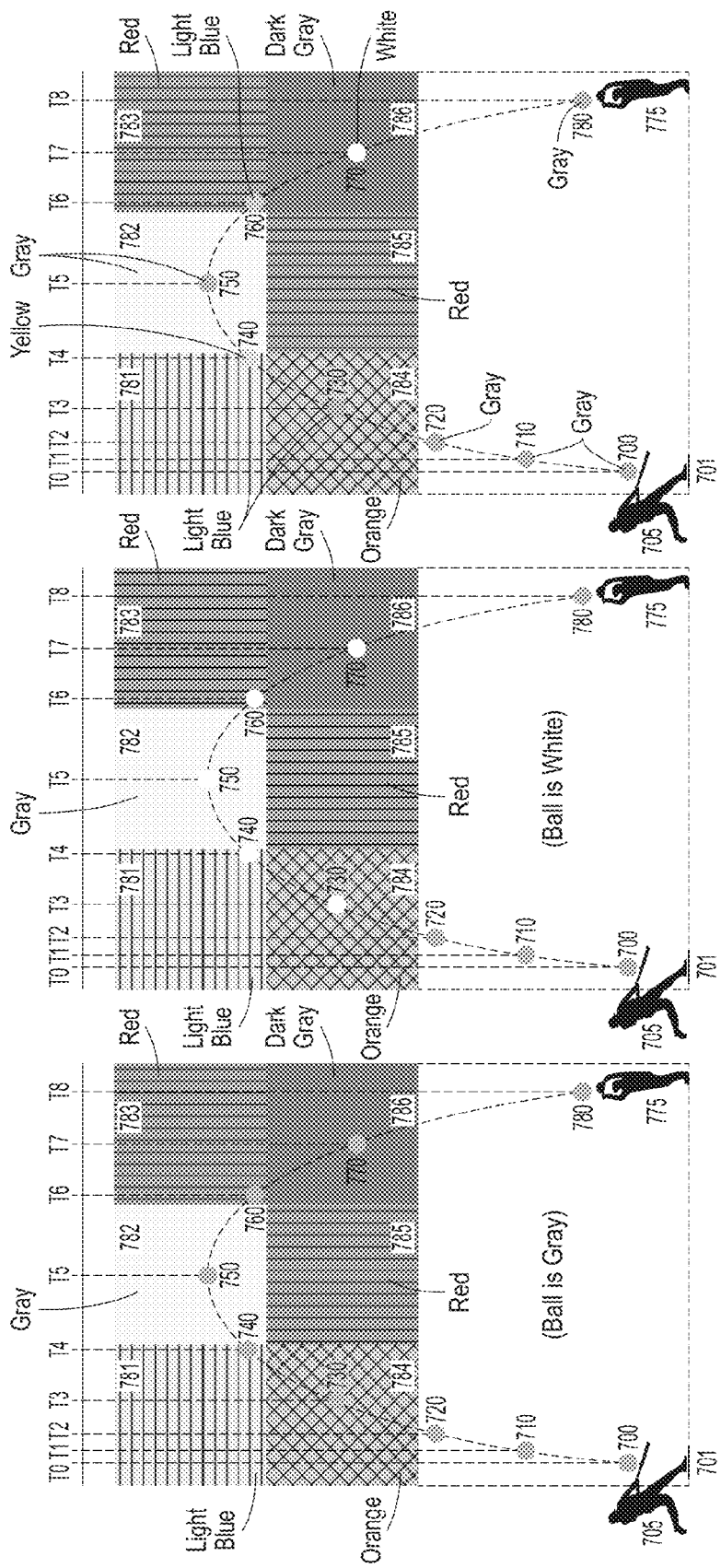

FIG. 7A-C illustrates diagrammatically a method of illuminating a ball with varying colors as it travels through the air according to aspects of the present invention.

Figure 8:
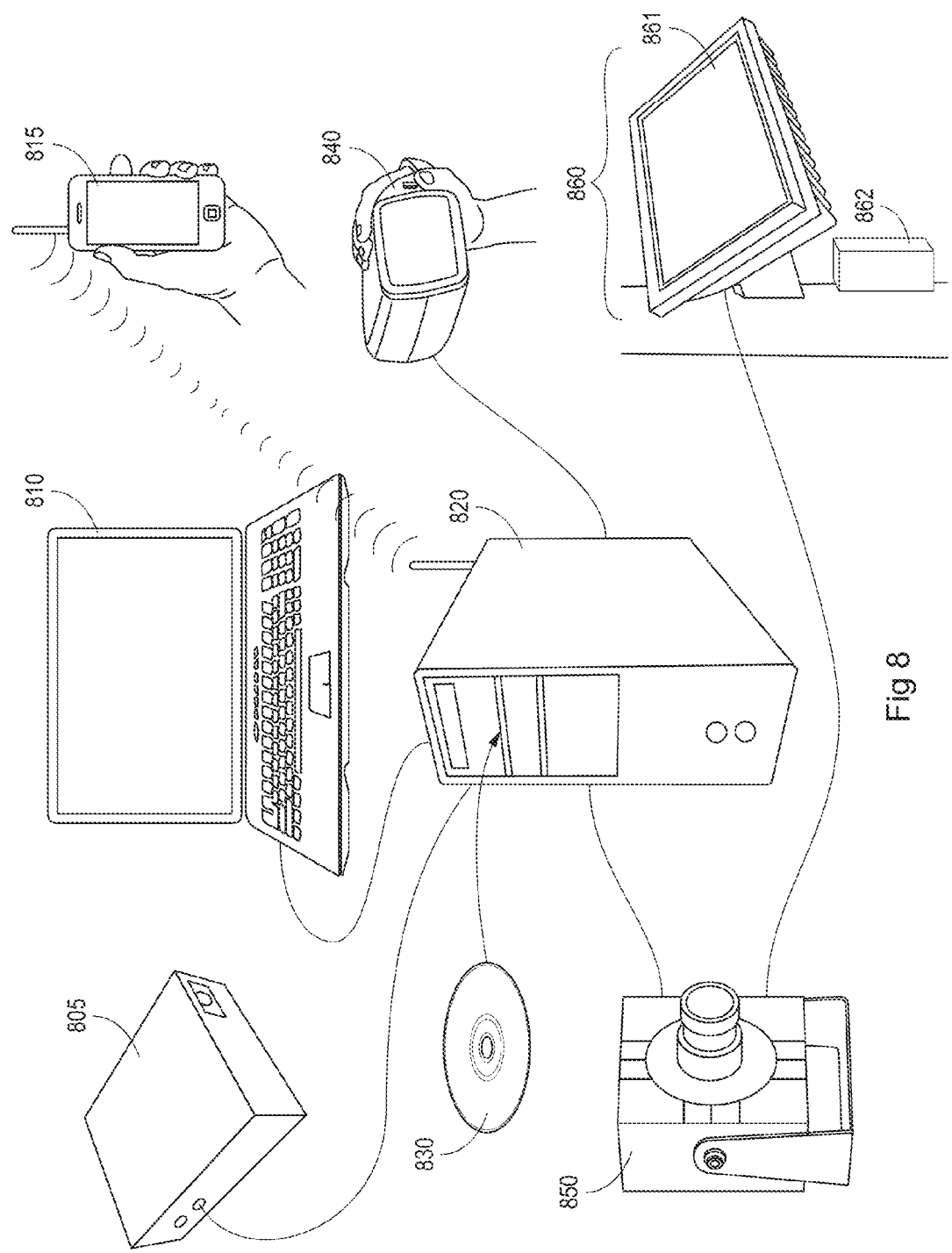

FIG. 8 illustrates an apparatus according to aspects of the invention.

FIG. 9A-G illustrate typical spectral reflectance readings for different sports ball exterior materials as tested with a spectral analyzer.

Figure 10:
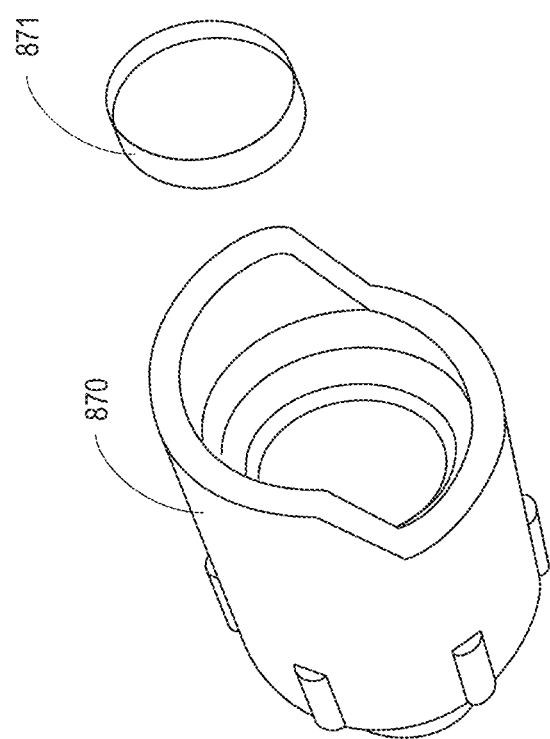

FIG. 10 illustrates a photocell with color filter according to aspects of the invention.

IV. DETAILED DESCRIPTION OF EXEMPLARY EMBODIMENTS

1. Overview

Increasing contrast and visibility for sports balls is highly desirable, and has been studied extensively. There are many examples of literature that shows that methods of increasing ball contrast can provide significant playability improvements. For example, Wellington in U.S. Pat. No. 7,444,770 (col. 1, lines 1-67 and col. 2, lines 1-39) cites numerous studies to this effect.

Figure 1A:
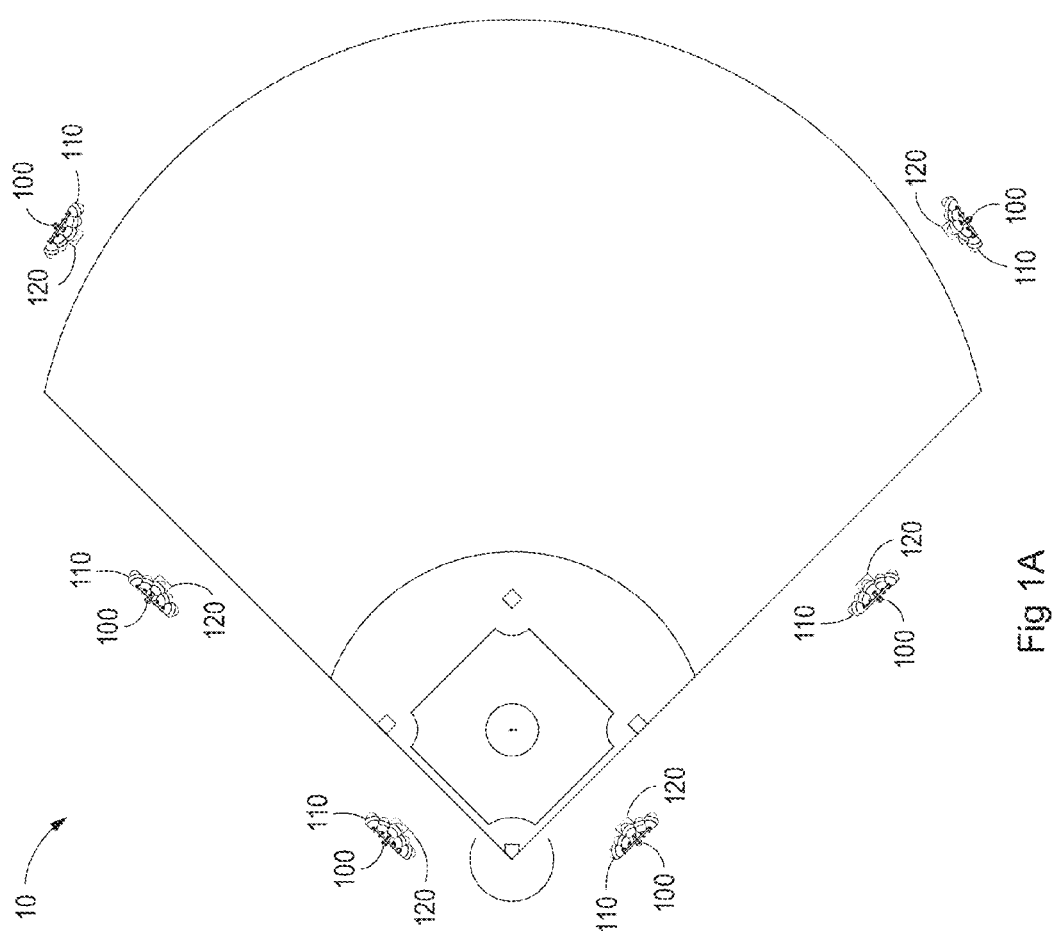
Figure 1B:
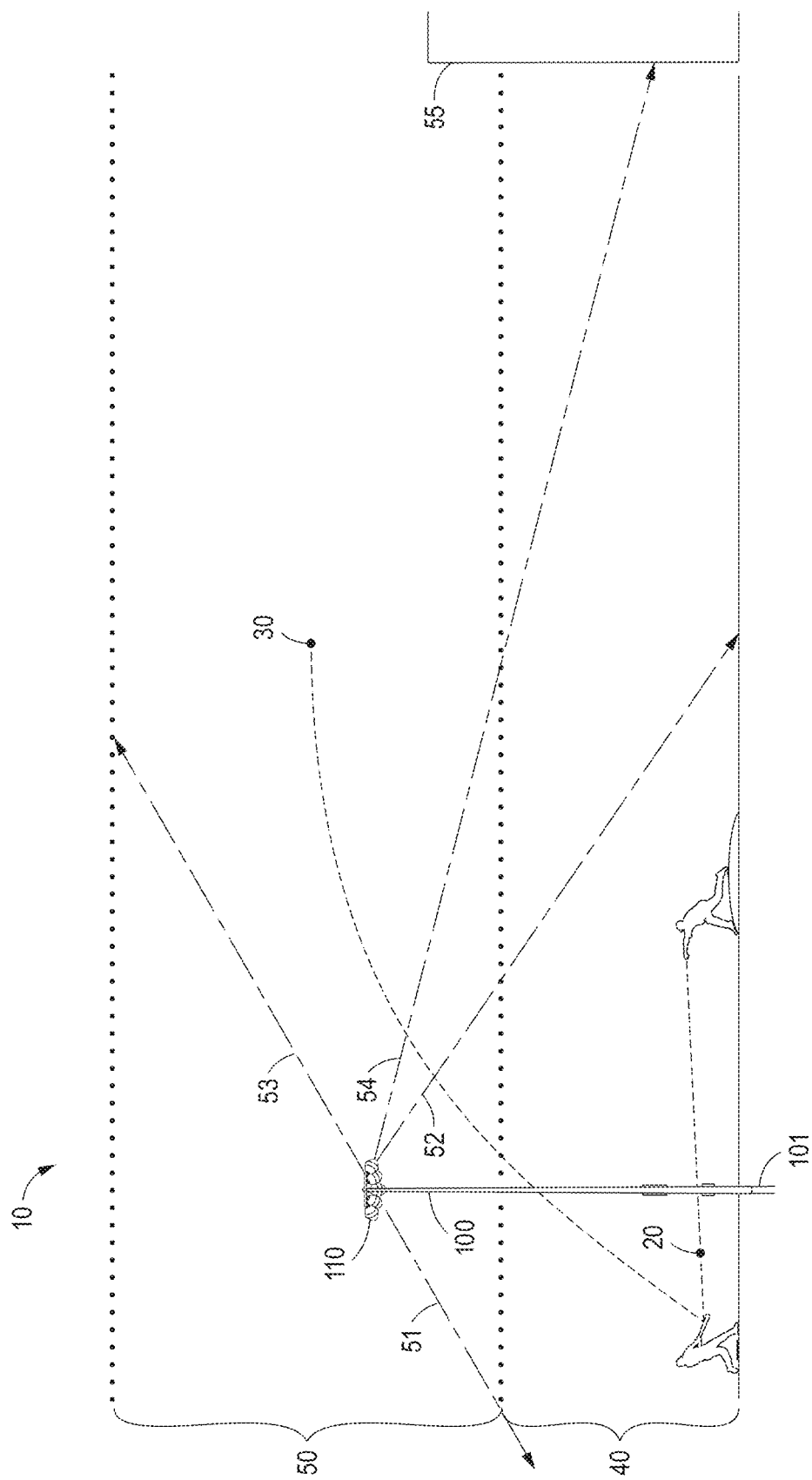
Figure 2A:
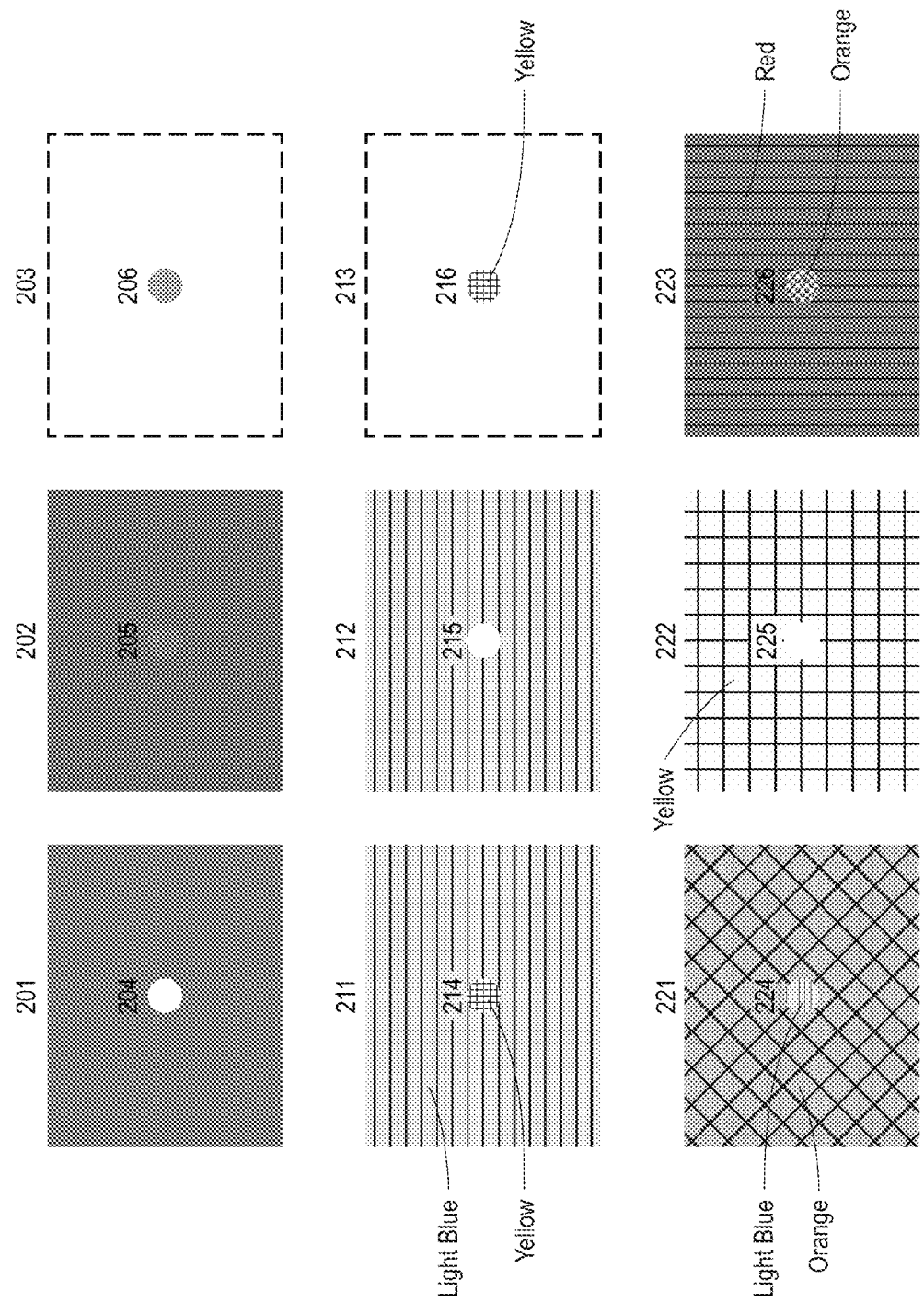

During daylight hours, the sky is typically quite bright, such that a ball 30, as seen in exemplary baseball field 10, of FIG. 1A-B in the air or "fly zone" 50 viewed from a field will be perceived of as a darker object against the sky and therefore will present a contrast with the sky. As seen in FIG. 2A, which illustrates simplified baseballs against colored backgrounds, a white ball 206, will actually appear relatively dark against a bright sky 203, and a ball colored in a contrasting color to the sky, such as a yellow softball 214 against a blue sky 211, may stand out even more. FIG. 2A illustrates gray scale (panel 201 is medium gray, panel 202 is dark gray, panel 203 is white, circle 204 is white, circle 205 is medium gray, circle 206 is medium gray). FIG. 2A also illustrates other panels or circles in color by distinct hatching. Blue hatching indicates blue color such as panels 211 and 212, vertical and horizontal cross hatching indicates yellow, such as at circle 214 and panel 222, diagonal cross hatching indicates orange, such as panel 221 and circle 226; vertical hatching indicates red, such as panel 223. Similar hatching for color is used in certain other figures.

Likewise, a ball 20 on or near the ground (in the "ground zone" 40, FIG. 1B) will, day or night, typically be perceived of as having a positive luminance relative to its surroundings. For evening or night games, since a ball in the ground zone will be illuminated by intense field lights 110, FIG. 1A-B, it will have a positive luminance in comparison with either the background (such as e.g. spectator seating areas) or the ground which will normally be a contrasting color. It will therefore have sufficient contrast for relatively easy visibility.

As previously noted, lights 110 on pole 100 at field 10, FIG. 1B, provide field lighting in the areas roughly between exemplary rays 51 and 52. This provides illumination of ball 20 when in the "ground zone" 40. Lights 110 also direct some light in the area roughly between rays 52 and 53, which provides some useful illumination on ball 30 in the "fly zone" 50, but also directs unwanted light as exemplified by ray 54 towards off-field object 55, which could be a residential building, office, or other location which is harmed by having unwanted light illuminating the object. It can be appreciated then that using field lights mounted on a high pole to direct light in a broad angle that illuminates the fly zone, will of necessity direct some light off the field in an undesired direction, resulting in unwanted light on neighboring properties. Conversely, when lights are carefully controlled to avoid glare (e.g. ray 54), this means that most or all of the light is directed down, and provides little or no upwards or "aerial" illumination so that unless special provisions are made, the area above the projected light from the field lights (i.e., the area between rays 52 and 53, FIG. 1B) will have little or no light shining on it. And the greater the control of glare and spill light, the less light will be available to light a ball in the air from below. Because of advances in aiming and control of LED lighting, this can be particularly true for LED lights used for field lighting. U.S. patent application Ser. No. 13/897,979 which is owned by the current applicant and which is incorporated by reference herein, illustrates an LED luminaire which provides extremely good control of lighting. When such a luminaire is installed as a down light, little to no useful light is directed in an upward direction, which emphasizes the need at least in certain circumstances for additional planned uplighting.

Thus under night time conditions, there is normally a three-dimensional "sky zone" 50, FIG. 1B, that has little or no light shining on it. A ball such as e.g. 205, FIG. 2A, in this sky zone silhouetted against the dark sky 202, with very little light on it from below, will be very hard to see. Even though its "color" is white, with very little luminance applied to it, it appears essentially as dark as the sky.

FIG. 2B illustrates a similar situation with aerial lighting and regular field lighting. Player 250 views ball 255 which is in the area 261 illuminated by field light 260 mounted on pole 290. Since the light falling on the ball 255 illuminates the upper portion 256 which is not visible to the player; the lower part 257 will appear dark. Therefore, area 261A, FIG. 2B, illustrates a view of a portion of the sky with the dark ball hemisphere 257 as it would be seen by the player in this situation. This situation provides good contrast of the ball with its background. The same player 250 now views ball 280 which is in the area 271 illuminated by aerial lighting 292, mounted on pole 293. Since the light falling on the ball illuminates the lower portion 282 which is visible to the player, the ball 280 will appear bright. Very little light falls on area 281, but it is not in the line of view of player 250 so its lack of contrast with the sky is not significant. Area 271A, FIG. 2B, illustrates a view of a portion of the sky with the light ball hemisphere 282 as it would be seen by the player in this situation. See also diagrammatical examples similar to FIG. 2A in the insets at upper left corner of FIG. 2B.

It may be appreciated then, that if light is directed toward the sky such that the ball receives even a relatively low amount of light, it will become much more visible, since the ball, but nothing else in the sky, (e.g. ball 204, FIG. 2A, contrasted with sky 201) will reflect the light from the aerial lighting. However, during twilight hours, the sky can vary in brightness and color from one area to another, and from one time to another, as illustrated photographically in FIG. 2C. So the amount of light needed to provide a positive illumination of the ball relative the sky can vary greatly as well, since at any given time during twilight, a ball in one location could have one of several possible contrast situations. These situations could include, for example: (1) good contrast of the ball 206, FIG. 2A, against a very bright sky 203 without aerial lighting (aerial lighting not required), (2) good contrast of the ball 204 which is illuminated by aerial lighting against a dark sky 201, (aerial lighting beneficial), (3) poor contrast of the ball 205 against a sky of relatively low brightness and neutral (gray) color 202, whether or not illuminated by aerial lighting, (4) poor contrast of the ball 215 against a dim but colored sky 212 when illuminated by a wide spectrum (white) aerial lighting, or (5) poor contrast against a dim but colored sky when illuminated by a colored aerial lighting of a similar color, such as a yellow ball 225 illuminated by a yellow light, against a yellow sky 222. Note that other combinations shown in FIG. 2A, further illustrate a range of contrasts that could be present (e.g. poor contrast of darker ball 224 against darker orange sky 221; lighter yellow ball 216 and lighter sky 213; or darker orange ball 226 and darker reddish sky 223. These are but a few examples. The range of contrasts is almost infinite. Table 1 below illustrates some combinations of sky conditions with optimal lighting settings:

TABLE 1

| SKY CONDITION | DAYLIGHT (Sky brighter than lamps) | EARLY TWILIGHT (Sky close to the same brightness as illumination from aerial lighting) | LATER TWILIGHT (Sky gray and dimmer than lamps) | LATER TWILIGHT (Sky colored and dimmer than lamps) | NIGHT (Sky dark) |
|---|---|---|---|---|---|
| OPTIONAL AERIAL LIGHTING SETTING | No aerial lighting | No aerial lighting | White aerial lighting, contrasting color temperature | Colored aerial lighting | White aerial lighting |

For general illustration purposes, FIGS. 2C and 2D are annotated to show areas of different colors and luminance relative to background such as sky. Different types and density of clouds, direct or indirect view of sunlight, and sky create these different levels of background. In this example, and with reference also to FIG. 2A, such background can frequently be gray scale, shades of orange, shades red, shades of yellow, shades of blue, and even some bright yellow or approaching white. FIGS. 2C and 2D also illustrate, purely on a gray scale level, variance in background luminance from almost black to almost white.

Figures 2E, 2F:
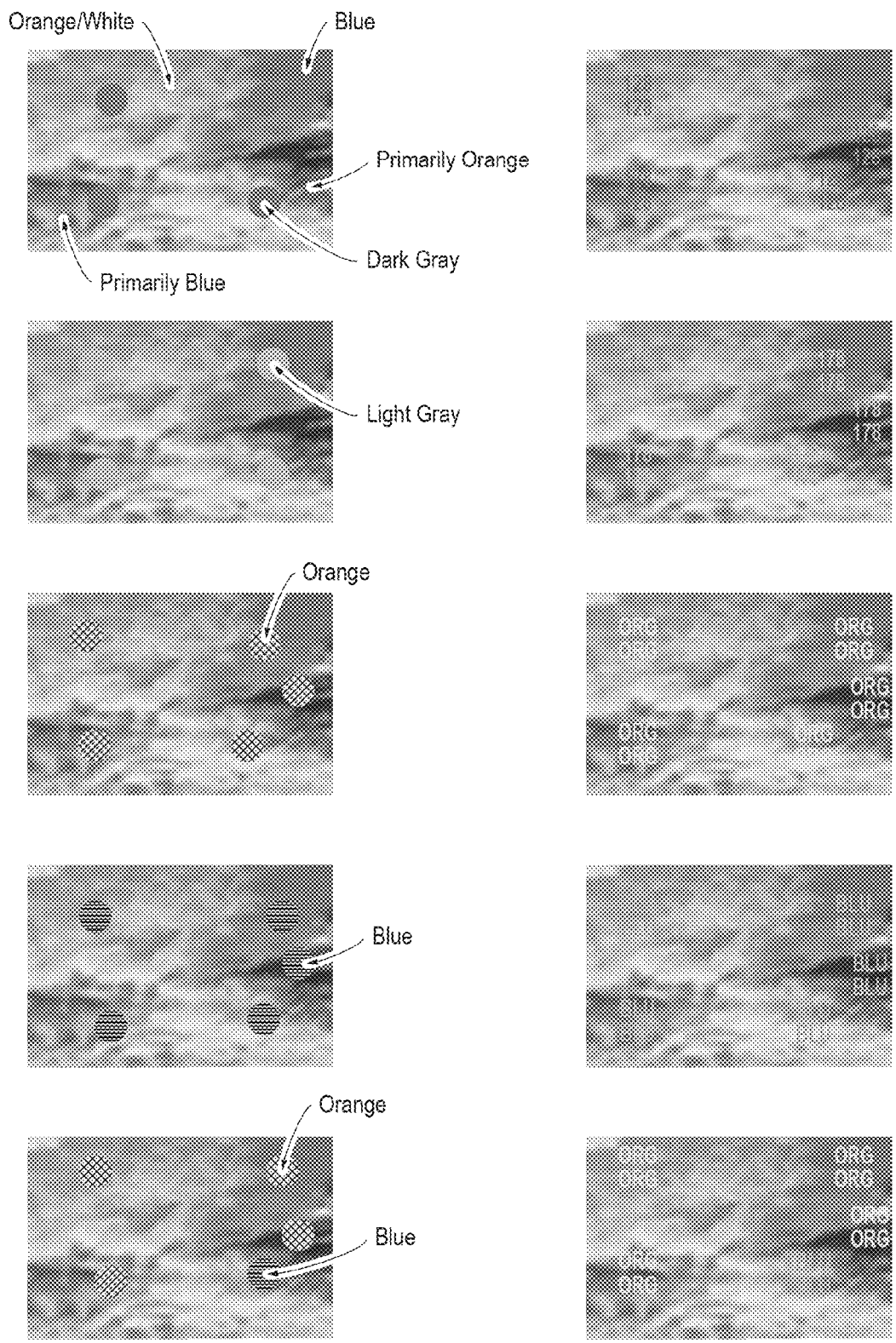

FIG. 2D is an enlargement of a subarea of FIG. 2C. It also includes those variances. FIGS. 2E and 2F are examples of how different colored or luminance objects against the background of FIG. 2D have varying levels of visibility, as will be further discussed below.

Further, attempting to provide lights which compensate for sky conditions without having a way to adjust for changing conditions is bound to be less than optimal, since conditions change according to time, both as the sun sets and as clouds move. And larger weather patterns can create spectacularly colored skies some evenings, as seen in FIG. 2C, and very plain skies other evenings. Thus a scheme that was set to adjust lighting in different areas of the sky with differing colors or light intensities based only on time of day and area of the sky would not be optimal.

Still further, there is a fundamental difference between the function of aerial lighting and downlighting which heightens the need for the present invention. Field lighting primarily illuminates the ground, which has a varying spectral reflectance depending on surfaces and therefore requires more or less white lighting, with a fairly normal spectral distribution so that the grass will properly reflect green, the infield will reflect brown or gray, etc. But aerial lighting is primarily intended to illuminate the ball in flight, since the backdrop (the sky) is not reflective. And in fact, aerial lighting as described herein will not normally be substantially visible in any way except as the illumination reflects off the ball in play in the air. Thus the constraints on what colors may be used are essentially removed. So if aerial lighting and field lights use the same source, coloring the light source to improve aerial lighting contrast could be very unpleasant esthetically for field lighting. For instance, red light on green grass would make the grass appear gray rather than green. But aerial lighting which is separate from downlighting can many times be of any desired color, since it only illuminates the ball in the air. Thus red light could be used for aerial lighting with good results under some circumstances without negatively affecting downlighting.

A method, system, and apparatus is therefore envisioned for providing improved visibility of sports balls, such as e.g. baseball, football, and golf, including during twilight or sunset conditions that does not substantially contribute to glare or spill light, wherein luminance and color of specific sky zones are monitored;
optimum or at least estimated beneficial aerial lighting color and intensity levels for existing conditions are determined;
aerial lighting comprises multiple colored LEDs or other quick responding light sources;
aerial lighting is controlled in real time or near real time;
aerial lighting is controlled separately from field lights;
aerial lighting color and luminance is optimized or at least estimated beneficial for best contrast of a ball in the air;
aerial lighting is optimized or at least estimated beneficial by providing light of a particular color and intensity at times when it is advantageous for contrast, or by turning off aerial lighting when turning them on would not enhance contrast;
aerial lighting is created either by directional control or by use of wavelengths that illuminate the ball without substantially contributing to visual light or light sources.

A major benefit of this method is improved visual contrast for airborne balls, specifically by facilitating turning on lights only when needed, and likewise facilitating not turning on aerial lighting at any point when it would reduce contrast. A further benefit, therefore, of this method is improved play in twilight hours. Another benefit is compensating for differing conditions, including sky backgrounds that change color and intensity over time. Further this method allows compensation for sky backgrounds with different color and intensity in different areas of view at the same time. This therefore provides for increased playability beyond that which is available simply by turning on white or full spectrum aerial lights A further benefit is the ability to quantify visual conditions specifically with regard to visual contrast between the background and a ball in play. This changes the decision for when to turn on the aerial lighting from a "best guess" to a calculated response to conditions as they exist. In other words, in the current state of the art, playability is reduced if lights are on too late or too early compared to the point at which the ball vs. sky contrast can be improved with the lights on. In contrast, aspects of the invention as envisioned increase playability by allowing the lights to be on at the point when the ball vs. sky contrast can be improved with the lights on. Further, in contrast to HID lighting, it allows minute by minute changes to aerial lighting.

Another benefit is a reduction in cost of operation of lighting by reducing the time lights must be on, and a relatively low power usage with increased visual contrast.

Another benefit is a reduction in "sky glow" caused by high levels of aerial lighting that were formerly necessary to provide adequate aerial lighting. This can be effected both by a decrease in the total time aerial lighting are required, by delaying their onset until necessary, and by decreasing the amount of light dispersed upwards, by providing the greatest visibility with the least amount of light.

Another benefit is availability of improved sky glow metrics that can be captured by using the background-monitoring sensors to capture and store information about background light levels, even when the lights are not on and no game is being played. This would allow history and trends in sky luminance at the field's location to be provided to the owners of the field or others interested in sky glow data.

2. Embodiments

Embodiment: Method and System for Providing Improved Visibility of Ball in the Air at Twilight Using Light Intensity Sensing.

In a method according to aspects of the invention, non-adjustable (i.e. fixed-color temperature) white aerial lighting is provided. Sky luminance is monitored, and a monitoring and control system determines when to turn on the aerial lighting for optimum contrast and playability, based on data previously determined for widely ranging conditions.

In this embodiment, an apparatus and system for intermittent aerial lighting with sky intensity or luminosity sensing is installed at a baseball field 10, FIG. 1A-C and FIG. 5. The area 50, as shown in FIG. 1B-C, receives little or no aerial lighting from the field lights 110. Aerial lights 120 are installed and aimed to provide illumination represented by rays 56 in area 50. Each separate aerial lighting installation includes an LED light source 120 which is aimed to illuminate a ball in play which is traveling in an arc from a batter at home plate as would be seen by an outfielder at e.g. locations K, M, and O, FIG. 5. Sky luminosity is measured for the visual range the ball could be expected to travel, from the perspective of the players who need to see the ball. So for baseball, the ball in play will rise into the air after being hit from near home plate, as represented by the ball trajectory 550, FIG. 5. The defensive team at positions K, M, and O will see the ball while looking at the sky areas A, B, C, D, mostly behind home plate. One or more sensors 565, FIGS. 4 and 5, which are installed in a position to monitor approximately the same background area as seen by the players, send a signal to a processing unit 710, FIG. 4, which determines whether adding aerial lighting will improve ball contrast with the sky, and further calculates the optimal brightness (e.g. lights may be left off, turned on to full brightness, or even turned on at an intermediate intensity) for one or more sets of LED lights 120 of FIG. 1C (also 760 FIG. 4). Note that if the sky is too bright, adding aerial lighting can actually reduce contrast by giving the ball a luminance that is too similar to the luminance of the sky.

The LED lights may be activated by a triggering system, such as found in U.S. patent application Ser. No. 14/064,667 (owned by the current applicant and incorporated by reference herein) so that they are only turned on when the ball is in the air. Or the aerial lighting may be turned on for the duration of the game. The lights provide aerial lighting in the sky above the field. Most of the light has no visible effect, since there is no background to reflect it, but the ball will be illuminated as it travels through the area lit by the aerial lighting. Thus aerial lighting is provided with optimal intensity for sky, ball, and ground conditions. The effect is illumination on the ball in play which is sufficient for the outfielder to be able to track the ball in the air.

At the same time, because of the mounting location and aiming direction, little or no light from the aerial lighting is seen by spectators, and little or no light from the aerial lighting contributes to unwanted light ("glare" or "spill light") outside of the playing area, such as spectator areas or in adjacent neighborhoods. Further, because a small amount of light on the ball is adequate to illuminate the ball against the dark sky, the amount of power used to light the aerial lighting is very low. If a triggering mechanism is used, it will limit operation of the aerial lighting to the very small amount of time when the ball is actually in play having been hit into the air by a batter, which very significantly further decreases the power usage as a percent of total lighting power, making the system very economical to operate.

This lighting method, system, and apparatus may also be used to increase contrast and visibility for sports other than baseball, such as golf or football. For example, for golf or football, aerial lighting would receive a command from a sensor system which monitors sky luminosity and calculates whether sky conditions warrant the use of aerial lighting in order to cause the ball to have the best contrast with the sky from e.g. the tee area (for golf) or for punt receivers (for football), and to avoid reducing contrast by giving the ball a luminance that is closer to the luminance of the sky background than it would be without the use of aerial lighting.

Embodiment: Method and System for Providing Improved Visibility of Ball in the Air at Twilight Using Light Intensity Sensing.

In a method according to aspects of the invention, an apparatus and system for intermittent aerial lighting is envisioned similar to the embodiment previously disclosed, with sky color sensing used in addition to sky luminance sensing. In this example it is installed at a baseball field 10, FIG. 1A-C and FIG. 5. The area 50, as shown in FIG. 1B-C, receives little or no aerial lighting from the field lights 110. Aerial lights 120 are installed and aimed to provide illumination represented by rays 56 in area 50. Each separate aerial lighting installation includes an RGB LED light source 120 which is aimed to illuminate a ball in play which is traveling in an arc from a batter at home plate as would be seen by an outfielder at e.g. locations K, M, and O, FIG. 5. Sky color and luminosity is measured for the visual range the ball could be expected to travel, from the perspective of the players who need to see the ball. So for baseball, the ball in play will rise into the air after being hit from near home plate, as represented by the ball trajectory 550, FIG. 5. The defensive team at positions K, M, and O will see the ball while looking at the sky areas A, B, C, D, mostly behind home plate. One or more sensors 565, FIGS. 4 and 5, which are installed in a position to monitor approximately the same background area as seen by the players, send a signal to a processing unit 710, FIG. 4, which determines whether adding aerial lighting will improve ball contrast with the sky, and further calculates the optimal color and brightness for one or more sets of RGB LED lights 120 of FIG. 1C (also 760 FIG. 4). Note that if the sky is too bright, adding aerial lighting can actually reduce contrast by giving the ball a luminance that is too similar to the luminance of the sky.

The LED lights may be activated by a triggering system, such as found in U.S. patent application Ser. No. 14/064,667 (owned by the current applicant and incorporated by reference herein) so that they are only turned on when the ball is in the air. Or the aerial lighting may be turned on for the duration of the game. The lights provide aerial lighting in the sky above the field. Most of the light has no visible effect, since there is no background to reflect it, but the ball will be illuminated as it travels through the area lit by the aerial lighting. Thus aerial lighting is provided with optimal color or color temperature and intensity for sky, ball, and ground conditions. The effect is illumination on the ball in play which is sufficient for the outfielder to be able to track the ball in the air.

At the same time, because of the mounting location and aiming direction, little or no light from the aerial lighting is seen by spectators, and little or no light from the aerial lighting contributes to unwanted light ("glare" or "spill light") outside of the playing area, such as spectator areas or in adjacent neighborhoods. Further, because a small amount of light on the ball is adequate to illuminate the ball against the dark sky, the amount of power used to light the aerial lighting is very low. If a triggering mechanism is used, it will limit operation of the aerial lighting to the very small amount of time when the ball is actually in play having been hit into the air by a batter, which very significantly further decreases the power usage as a percent of total lighting power, making the system very economical to operate. And in some embodiments, a radar or other type of tracking system is used to anticipate the trajectory of the ball as it travels through the air, so that instead of requiring different sets of LED aerial lights for different sky zones, some or all of the aerial lights can have their color outputs modulated so that the light striking the ball changes to maintain a high degree of contrast with the sky background as viewed by the players attempting to track and catch the ball. This can be seen with reference to FIG. 5. A player at location K will see the ball in its trajectory 550 against the sky background areas B and D. For the same ball trajectory 550, a player at location J would see the ball against sky background areas A and C. Further, a spectator in the bleachers in location P would see that same ball against sky background areas E and F. So if areas B and D were blue, the optimized color to enable the player at location K to see the ball might be yellow. But if areas A, C, E, and F were orange, lighting the ball with yellow light would actually decrease contrast. So it is important that the ball trajectory be predicted accurately with reference to the person or persons who have the greatest need to see the ball in the air. So if a single sensor can span on the order of 120 degrees of the view of the horizon, it would likely be able to sufficiently differentiate between different zones of the sky. But if a wider view is desired, or if a given sensor had a narrower horizontal sensing angle, it might be necessary to install multiple sensors to be able to differentiate between different zones of the sky.

This lighting method, system, and apparatus may also be used to increase contrast and visibility for sports other than baseball, such as golf or football. For example, for golf or football, RGB-capable aerial lighting would receive a color command from a sensor system which monitors sky color and calculates first whether sky conditions warrant the use of aerial lighting, and second calculates the optimum aerial lighting color to cause the ball to have the best contrast with the sky from e.g. the tee area (for golf) or for punt receivers (for football).

Figure 5:
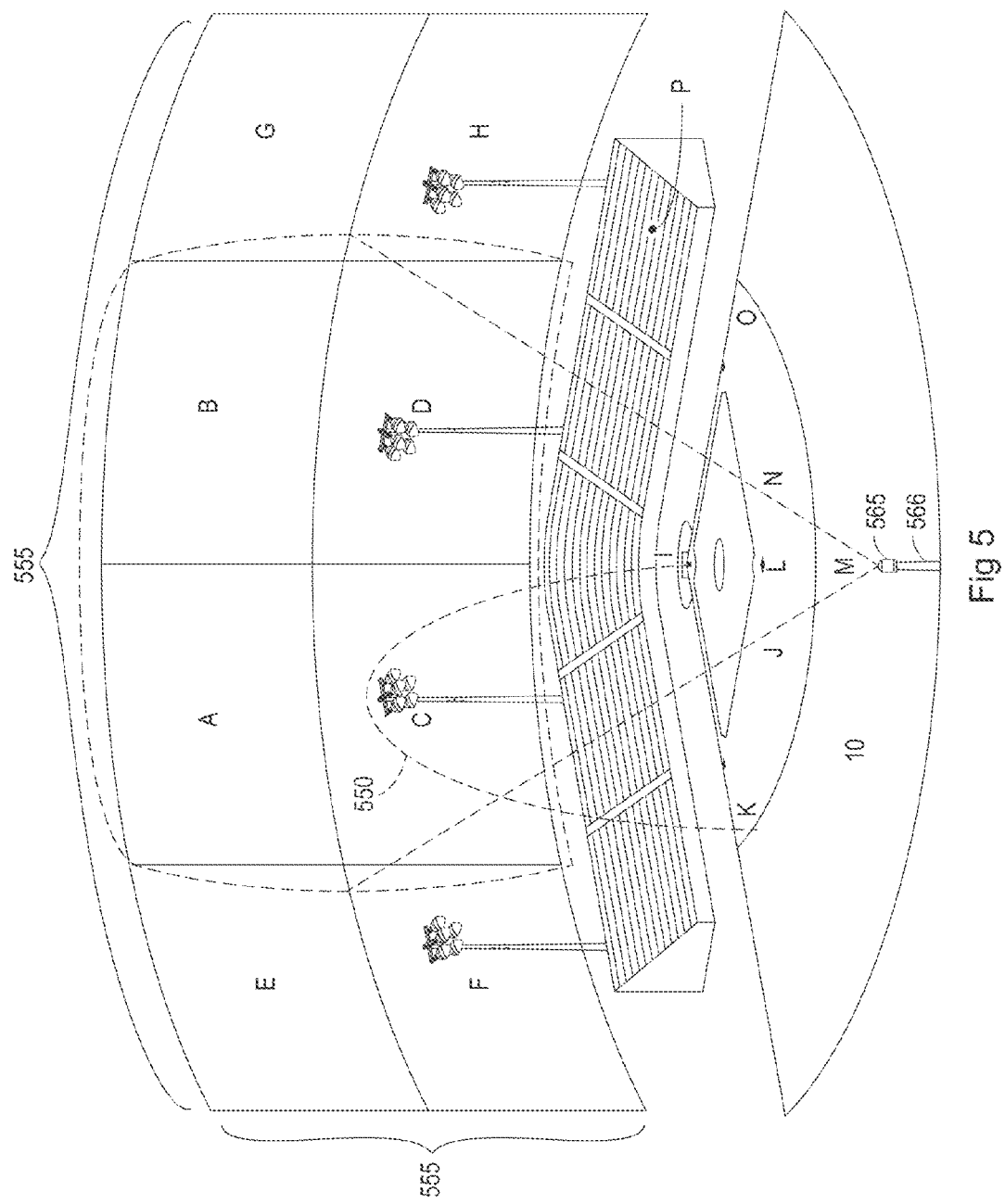
FIG. 5 illustrates a baseball stadium with light and color sensors and aerial lighting installed according to aspects of the present invention.

Note: FIG. 2C-D and FIG. 5 illustrate how the sky can be "zoned" using a grid system. FIG. 2C is a photograph of a twilight sky, divided by a grid of 12 horizontal and 12 vertical areas. Areas J7, K7, J8, and K8 are copied and expanded from FIG. 2C to FIG. 2D. It is easy to see that K8 has a predominantly orange color, compared to J8 which is predominantly blue. (Of course this is a simplified illustration, since digital cameras or other sensors can capture many more areas than shown in a twelve-by-twelve grid.) FIG. 2E illustrates areas J7, K7, J8, and K8 with different colored representations of balls overlaid to show in a simplified fashion how shining a colored light on a ball against the sky background (which is of course unchanged by light from aerial lighting) can give much greater contrast. FIG. 2F shows the same sky area, with a somewhat more realistic depiction of the contrast issues, by using colored text, rather than a large circle. Note that FIG. 2F represents in words the colors which are represented by the balls of FIG. 2E, and the background areas of both 2E and 2F are the same as the area shown in FIG. 2D. This shows how a small object of a similar color can be lost, but the same object in a contrasting color is much easier to find. In FIG. 2E, the circles diagrammatically representing objects against the background of FIG. 2D have been hatched if intended to represent specific colors (diagonal cross hatching indicates orange, vertical single hatching represents blue). Other objects in the top two panels indicate variations in gray scale (top panel darker gray, second top panel lighter gray).

Note also: FIG. 5 illustrates how a single sensor 565 might be installed at a baseball stadium. A two-by-four grid 555 has been superimposed on the sky, and areas A, B, C, and D are used to define the view that players in positions K, M, and O would see when watching a ball batted into the air from home plate on baseball field 10. Areas E, F, G, and H represent areas that are not reported for purposes as described here, but might be if tracking of "foul balls" outside of the normal play area were desired, for e.g. visibility or safety for spectators. Locations J, L, and N represent additional field locations that might be specified in calculations for ball trajectory.

Figure 6:
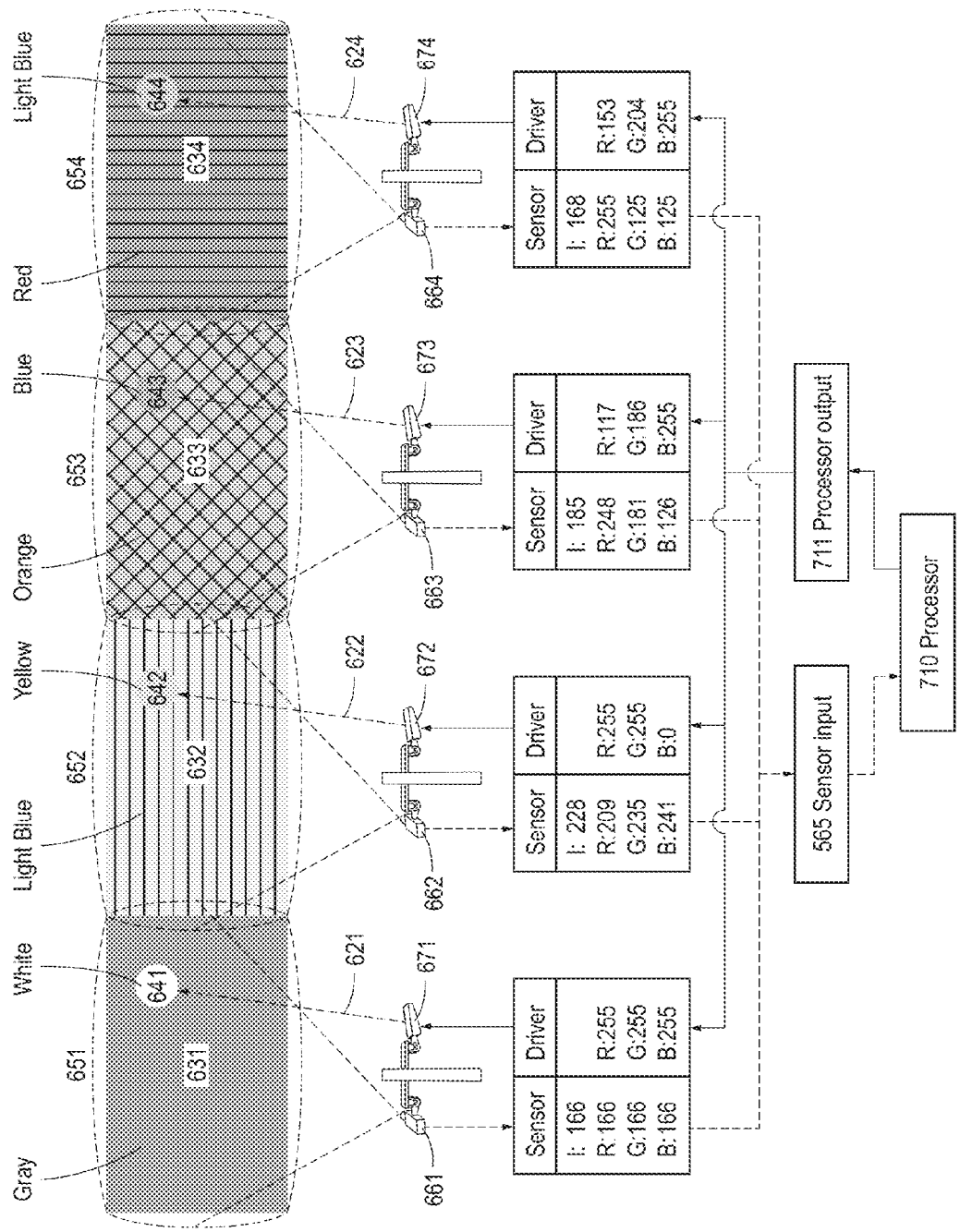
FIG. 6 illustrates a simplified view of a sensing apparatus and aerial lighting apparatus according to aspects of the present invention.

FIG. 6 is a simplified representation, not to scale, of another type of capture of sky areas 651-654, (which could correspond to areas A-D, FIG. 5) using 4 separate sensors 661-664. Each sensor reads a constrained area (651-654) which corresponds to a specific area in the sky, 631-634, respectively, and provides an RGB and an I ("intensity") input 565 to the processor 710. The RGB value for each sensor is illustrated in terms of the simplified colors shown; for example sensor 663 reads RGB values of (248, 181, 126) for the illustrated orange sky. In this simplified example, an I (intensity) value on a scale of 0-255 is also reported. For purposes of illustration here the value is simply the average of the RGB values, or 185 for sensor 663. Actual intensity values may be calculated on, e.g., a logarithmic scale in order to more accurately express the widely ranging potential values, or they may be simply reported as a 0 or 1 value where 0 indicates no aerial lighting is needed and 1 indicates aerial lighting is needed. Or another method may be determined to be beneficial for a given installation. Based on sensor inputs 565, the processor 710 (also FIG. 4) provides an RGB output 711 to each LED driver which has been determined to provide the most contrast for the lighting conditions. Then each LED luminaire 671-674 provides the specified light, as represented by single rays 621-624, so that if a ball (641-644) is visible in a given sky area 631-634, it will be illuminated as shown. For example, in response to RGB values from sensor 663, driver values (117, 186, 255) are supplied to LED luminaire 673. Panels 632, 633, 634 have been hatched to diagrammatically illustrate color (light blue for 632, orange for 633, red for 634). Panel 631 is not hatched but indicates gray. Objects 641-644 have been annotated as to representative color.

Embodiment: A Method for Determining Aerial Lighting Response to Ambient Conditions A method according to aspects of invention is illustrated in Flow chart 500, FIG. 3: Initial inputs 505, such as e.g. system ON/OFF, game time and duration, constant or event-triggered operation, ball color or reflectance, etc. are entered. Color and intensity 515 is measured for sky zones such as e.g. pixel-by-pixel or areas A-D, FIG. 5. Variables identifying color and luminosity per sky zone are stored, 520.

A calculation 530 is made whether to turn aerial lighting ON or OFF and best color to output, using stored values and algorithms 510. If a "ball in the air" trigger is used, an "aerial lighting ON" decision will only be selected if trigger event 525 has occurred. If an "aerial lighting ON" decision is selected, an "ON with specific RGB values" command is output, 540. If an "aerial lighting OFF" decision is selected, a "turn lights OFF" command 541 is sent. LED drivers 545 then drive LED luminaires. This process is repeated, 546, for as long as aerial lighting is desired. If ball tracking is used, radar or other ball tracking input 507 would be included in stored variables 520 and driver output 545 would vary based on ball trajectory prediction. Optional sky glow metrics output 547 is sent to local or remote recording unit for use or analysis by others.

Figure 4:
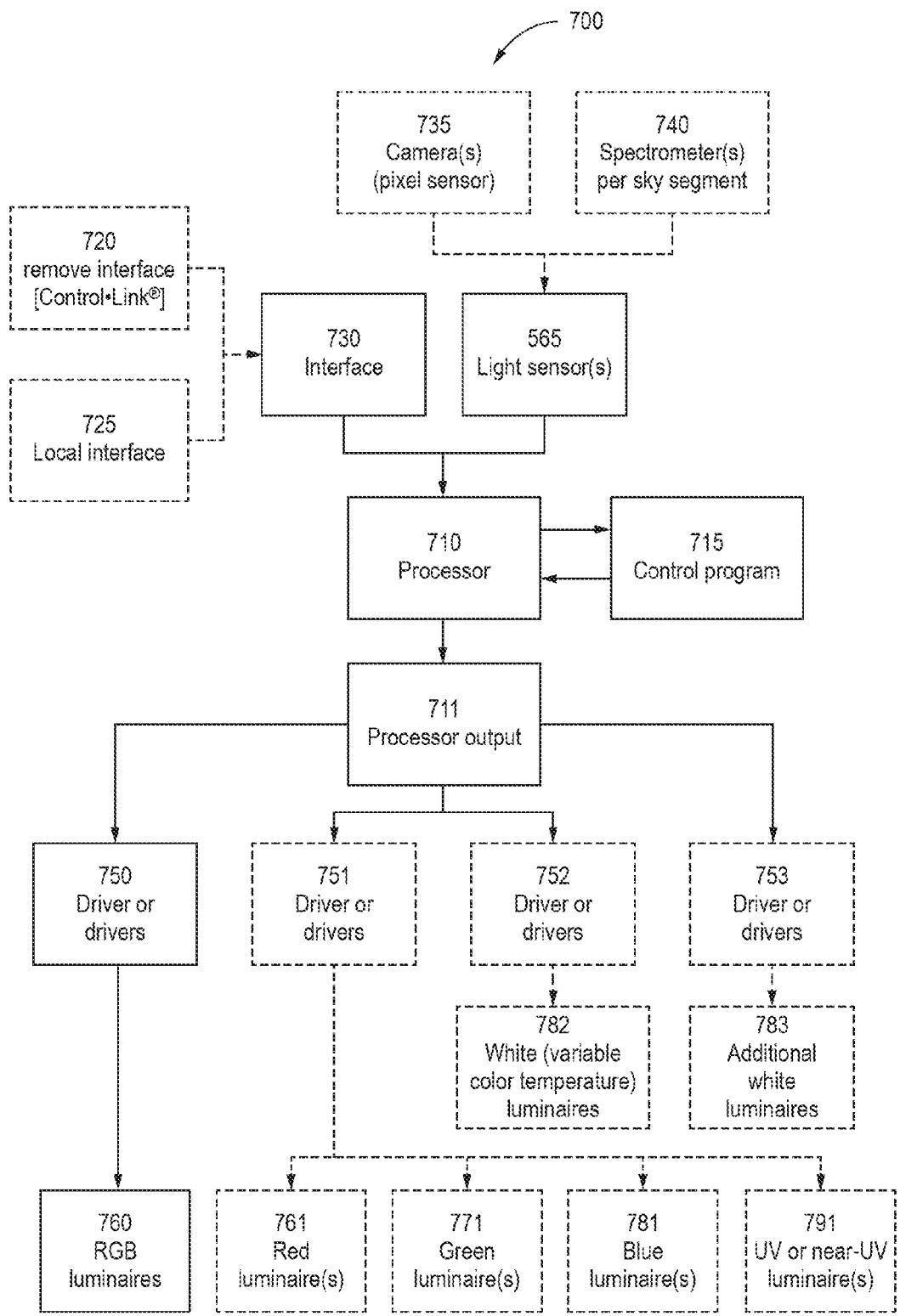

An apparatus and system according to aspects of the invention are further illustrated in block diagram 700, FIG. 4. Processor 710 runs control program 715. An interface module 730 receives inputs from operator input units such as e.g. a remote interface 720 or a local interface 725. Light and color sensor(s) 565 using e.g. color camera(s) 735 or spectrometer(s) 740 sends sky color and luminosity information to processor 710. Drivers such as e.g. 750-753 receive power and color commands 711 from processor 710, and drive one or more aerial lighting luminaires such as e.g. RGB luminaires 760; Red 761, Green 771, and Blue 781 luminaires; UV or near-UV luminaires 791, variable color temperature white luminaires 782; or even additional white luminaires 783.

Method for Providing Contrasting Colors

Figure 3:
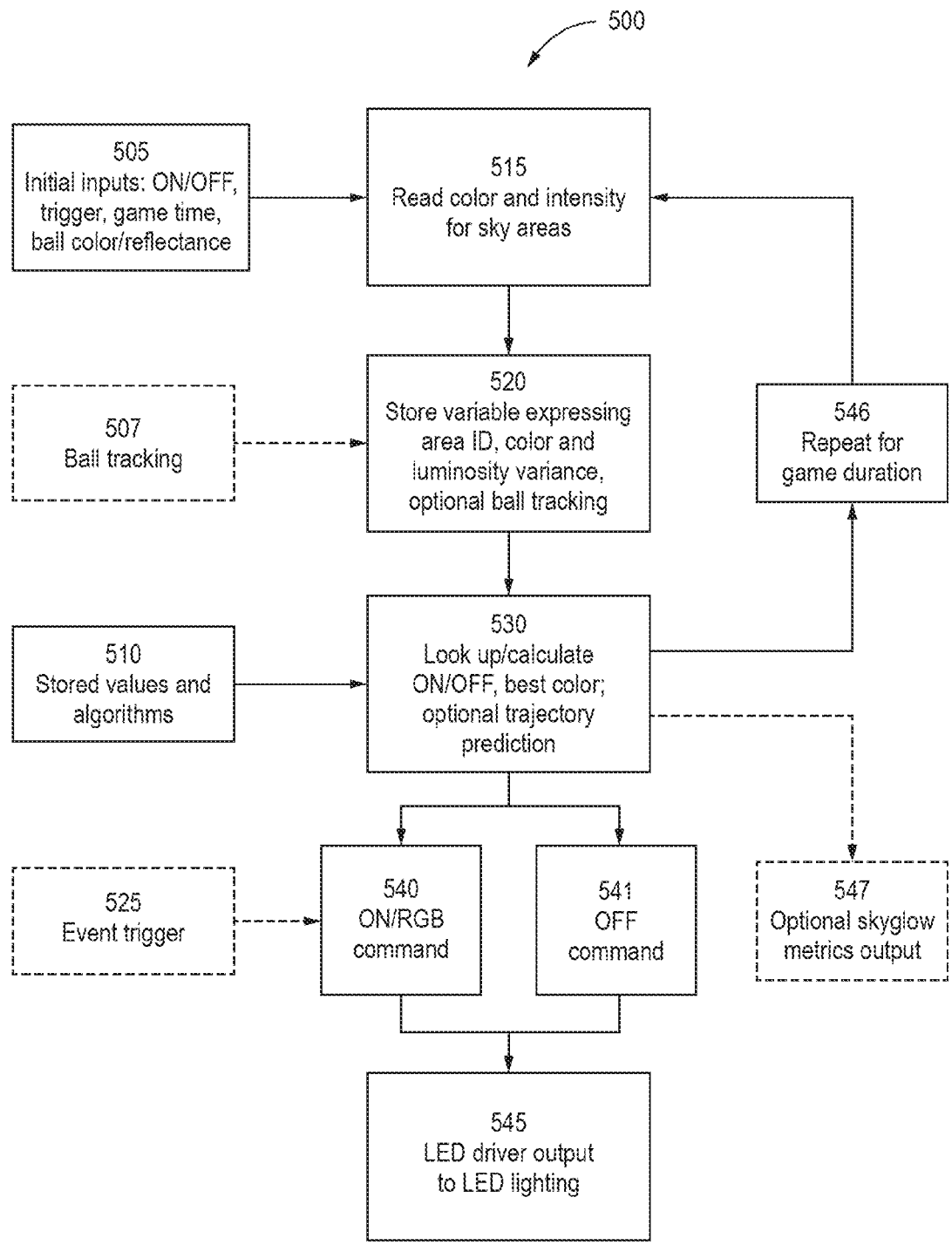

A simplified method of providing contrasting colors, corresponding to step 515, FIG. 3 and using light sensors 565, FIG. 5, uses an RGB color model which is well known in the art to characterize the color of an individual pixel as sensed by a color camera. Each pixel will have a value from 0 to 255, where black has an RGB value of (0, 0, 0) and white has a value of (255, 255, 255). For the "pure" colors, Red is (255, 0, 0), Green is (0, 255, 0), and Blue is (0, 0, 255). So for a portion of the sky that is captured by one pixel in a camera or sensor, it will calculate a numeric color value which can be used to represent that color in software. For example, a pixel representing a small area of the sky might be a pinkish color, for which the camera sensor provide an RGB value of (201, 159, 155). To calculate the inverse of the color, which is nominally the most contrastive, the original values are subtracted from 255. Of course, pixel values could be combined or averaged if fewer, larger areas were desirable to work with. In this case, (255, 255, 255)−(201, 159, 155) yields (54, 96, 100). In this simplified model, the RGB values (54, 96, 100) would be provided to a controller that provided a stepped output control of an RGB-capable LED luminaire. Within this luminaire would be a plurality of RGB LEDs, which could be driven at a power level that was broken into 256 steps, from 0 to 255. So given the sky color (201, 159, 155), the LED luminaire output might be the dull greenish color resulting from an output of RGB (54, 96, 100). However, since this does not result in a very bright output from the LED light source, it is likely that a better programmed response would leave the RGB Red level at or below 54, but would boost the Green and Blue levels. Using an RGB value of (54, 196, 200) for example, (with G and B levels boosted by an arbitrary 100 counts) yields a much brighter green blue color that is more likely to provide both the color for a good contrast with the reddish sky and the luminance that is required to make the ball more visible. Of course, further experimentation under actual sky conditions will provide optimum values for illumination under field conditions with RGB LED aerial lighting. Many factors will play into the final selection of output values for a given input value. For example, colored LEDs can have a differing light output in lumens from given for the same power input in watts. Further, human perception of light levels for a given measured luminance differs widely, depending on the color of the light. The human eye is much less sensitive to blue light than green light, which may mean that a greater amount of blue light is needed to provide contrast to a reddish background; or algorithms may be weighted towards green in order to provide better overall visibility. Still further, other factors such as the ability to handle and dissipate heat, or lumen depreciation factors based on LED use at high power levels may affect the algorithm for best contrasting light color for given conditions. Finally, it is recognized that human perception of luminance vs. color uses complex physiological mechanisms, including different structures in the eye ("rods and cones"). The physiology is particularly complex when light levels are transitioning from daylight to night time and the human eye is transitioning or is near the transition from "photopic" to "scotopic" vision. Thus it is reasonable that sensors used in embodiments of the invention could be separate for luminance vs. color, or may require complex calibrations to determine light levels for "on/off" decisions vs. deciding sky color and optimum contrasting colored lighting. So an RGB value ranging from (0, 0, 0) to (255, 255, 255) may provide sufficient range for color calibration, but luminance may require logarithmic scaling of sky luminance vs. a digital or analog luminance output. Or it may be that a simple threshold value or a scale that provides information about sky luminance that is fairly accurate only at near twilight levels will suffice to determine when aerial lighting should be turned ON or left OFF for best contrast.

Since embodiments of the invention envision reflectance of light having a particular spectral power distribution (SPD) from a ball in play in the air, the spectral reflectance of the ball needs to be considered. There are several reasons for this. First, balls may be of different colors. A baseball is normally white, a football is brown, a golf ball is often white but may be many other colors; a softball is normally yellow. The calculation of the best light value for optimum contrast from a white baseball may not be the same as what would be optimum for a yellow softball since they will reflect light differently. Further, since the ball is in play in outdoor conditions, the color and reflectance may change as the ball gets dirty from play. Therefore, the control program could be made to assume a specific ball reflectance based on the type of game or other factors, or an input method could be provided to enter reflectance or color value for game balls. For example, a light of known spectral value could be directed to the ball, and the reflectance measured from the ball. Or previous measurements of different types and conditions of game balls could have been made so that one of several pre-existing options in the software could be selected as an input.

Along with providing a variable color output, it may be valuable under some conditions to provide "white" aerial lighting that has a different color temperature than the field lights. The human eye is known to adapt to differing color temperatures and interpret the prevailing one as simply being "white." So if a different white value is seen, it will initially be perceived to have a color tint. (This is easily seen when driving at night: lower color temperature headlights look "white" by themselves until headlights that have a very high color temperature and that appear "bluish" are seen. The other headlights then will appear yellow or reddish, even though their color temperature has not changed.) For instance, if the field lights have a high color temperature, e.g. 5000K, the aerial lighting could use a lower color temperature light, e.g. 3000K, which could cause the ball to appear slightly reddish and make it visually stand out more in the short time it is in the air. These factors are well known in the art and of course will need to be included in modeling for optimum contrast.

Further, optionally, ultraviolet or near-ultraviolet (sometimes called "black light") light from an aerial lighting luminaire, either by itself or in conjunction with RGB or white aerial lighting, could be used to cause a ball to fluoresce, improving visibility and contrast. The use of ultraviolet light could further be considered as part of the programming for calculating visibility, since there may be factors influencing when using UV or near UV light would improve contrast and when it might not. For instance, in periods when aerial lighting would cause a ball in the air to have a luminance that approximates sky luminance, adding UV lighting might improve contrast by creating a highly visible fluorescence which could be a particular contrasting color, either in addition to or as a replacement for white or RGB aerial lighting. This effect could be utilized not only for aerial lighting, but also for field lighting in order to improve contrast of the ball with the field, grass, etc. (It should be noted that health concerns for exposure to UV lighting will influence selection of lighting for optimal benefit with attention to mitigating health risks). This might be done by using only near-UV lighting to create fluorescence, or by e.g. ensuring that exposure of personnel to shorter wavelength UVA lighting is prevented or eliminated by careful directional aiming, limited/intermittent operation, or other measures.

It should be noted that conditions and settings will normally relate to a time factor. Sky color at twilight can change minute by minute; thus it will be advantageous to vary aerial lighting color concurrently. Further, aerial lighting should remain off until a time where the artificial lights can provide improved visual contrast on the ball. As will be seen, aerial lighting operation during certain time periods can actually reduce contrast, visibility, and playability. This means that the algorithm for control program 715, FIG. 4, must be optimized for real conditions through extensive testing of actual conditions against player perceptions. In other words, calculations for contrast can provide a beginning for the algorithm, but variations and non-linearities in human perception under differing conditions will require modification based on real-world conditions. For example as sunset commences, the field lighting may be turned on, however if the system determines the sky luminance is too high, then the aerial lighting system will remain off until the luminance of the sky is low enough. Conversely, if the sky luminance is relatively low, aerial lighting could be used at the same time as (or even prior to) when field lights are turned on. The power level (lumen output) of installed aerial lighting, along with factors relating to SPD of the aerial lighting vs. reflectance of the ball will likely require 'tuning' the operation of a given system even though the principles are well-established herein.

It should be further noted that ideally, aerial lighting will be customized so that lighting is appropriately matched to each area of the sky. The number of zones or areas may vary from a single background zone up to as many zones as can be economically lit by RGB or multiple color temperature LED lights. Alternatively, under some conditions, it may be desirable to provide only one set of colored lights in order to provide some benefits of the invention at a lower cost. This would require analyzing sky luminance and determining first whether turning ON aerial lighting will improve contrast and playability. Next, sky color is analyzed, and an optimum color is output for best contrast. This would require calculations using stored research data to determine acceptable ranges of sky colors vs. aerial lighting colors. For some sky conditions, white light of a particular color temperature would likely be optimal due to a possible wide range of sky colors, from blue to red, being present. But in some circumstances, the sky might be fairly uniform such that a particular color of light would provide best contrast, such as yellow light against a deep blue sky background. But even if it was not possible to increase color contrast with the lower cost system, in most cases, it would be beneficial to possess the ability to determine accurately when adding available aerial lighting would still be helpful rather than detrimental and would be a very valuable function of the sensing and aerial lighting system.

Calculating Contrast Over Time

In order to provide contrasting illumination on a ball in play, the sky or background could be divided into four zones, and for purposes of discussion, the time of operation divided into 4 time periods. These time periods may be somewhat arbitrarily described as:

(1) early twilight,
(2) mid-twilight,
(3) near night time, and
(4) night time.

Note that time periods would typically moment-by-moment rather than discrete time periods; these limited time periods are discussed for simplicity but lighting output could vary second by second or at any desired interval.

Figure 1D:
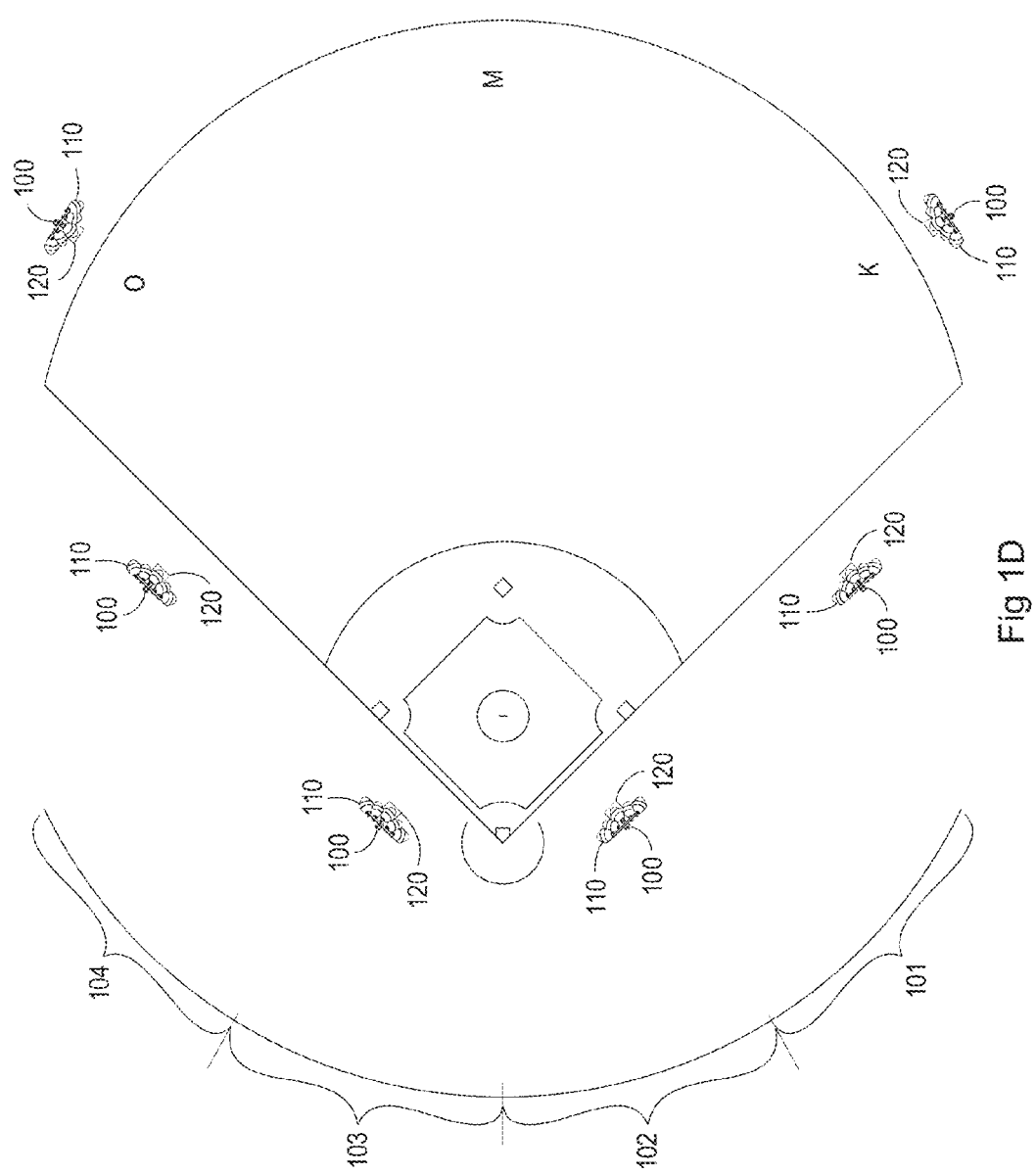

Sky zones are represented by the arcs 101, 102, 103, and 104 in FIG. 1D, which in turn approximates the background view of players in the outfield in e.g. positions K, M, O, FIG. 1D:

Zone 101=western portion of the sky
Zone 102=northwest
Zone 103=northeast
Zone 104=eastern portion Consider the following exemplary lighting conditions and outputs per zone and time period:

During the first time period (early twilight), the sky ranges from orange to bright to blue to very dark:

Zone 101: sky lighting condition orange; output BLUE aerial lighting,

Zone 102: sky lighting condition very bright, output no aerial lighting

Zone 103: sky lighting condition blue, output RED aerial lighting

Zone 104: sky lighting condition is very dark; output WHITE aerial lighting.

During the second time period (mid-twilight), as the sky transitions to night, red appears, changing the "no aerial lighting" area zone 102 to blue aerial lighting, and the blue area zone 103 gets darker:

Transition to no bright sky could

Zone 101: sky lighting condition orange sky; output BLUE aerial lighting,

Zone 102: sky lighting condition red; output BLUE aerial lighting

Zone 103: sky lighting condition dark blue; output RED aerial lighting

Zone 104: sky lighting condition very dark; output WHITE aerial lighting.

During the third time period (near night time), one colored zone remains with the other zones very dark; zones 101, 103, and 104 require white aerial lighting and Zone 102 still requires blue aerial lighting:

Zone 101: sky lighting condition very dark; output WHITE aerial lighting,

Zone 102: sky lighting condition dark red; output BLUE aerial lighting

Zone 103: sky lighting condition very dark; output WHITE aerial lighting

Zone 104: sky lighting condition very dark; output WHITE aerial lighting.

Finally, at some point after the sun has fully set, it becomes night time and all aerial lighting outputs white light for optimum playability.

Color Considerations

Depending on the color of the ball in use, a different or more contrasting color of illumination may be applied to the area above the sports field. For example, it is common for a softball to be colored with an optic yellow dye on its cover. Golf balls are also frequently some color other than white. Further, if the use of UV aerial lighting is desired, any of the balls used in sports may already exhibit some natural fluorescence in response to UV light, or a fluorescent dye could be added, by the manufacturer or distributor, or even at the game site. In fact, some golf balls already appear to have fluorescent dye or colorant added to their covers by the manufacturer.

FIG. 1E-F show a scenario where aerial light luminaires are installed on light poles and provide colored aerial illumination. In this scenario, aerial lighting luminaires 121, 122, and 123 are installed on pole 101, providing aerial lighting areas which are controlled to be blue, green, and yellow, respectively. Similarly, aerial lighting luminaires 124, 125, and 126 are installed on pole 103, providing aerial lighting areas which are controlled to be yellow, white, and blue, respectively. This is shown as a side view of baseball field 10, FIG. 1A, however poles and luminaires could be installed in any desired location to provide colored aerial illumination in any desired location.

Embodiment: Lighting for Flight Path Coloration

A method according to aspects of the invention provides aerial lighting that is optimized for contrast against a view of the sky; which view changes over time relative the observer due to the travel of the ball by predicting ball trajectory.

When a baseball is initially hit at home plate and flies up into the 'fly zone,' a tracking system is used to project the trajectory of the ball. This may be done e.g. by a radar system such as one which has been installed in accordance with patent application Ser. No. 14/064,667 (which is owned by the present applicant and which is incorporated by reference herein) and which has been adapted for use according to the present invention is able to track its position and velocity. One way to do this is to record the ball's position in space (e.g. position at x,y,z coordinates) at two moments in time, and calculate its velocity (speed and direction of travel) by comparing the recorded data. Or a radar system using Doppler radar may be able to read ball position, speed, and direction directly. Another way to project ball trajectory is explained in U.S. Pat. No. 5,443,260 which is incorporated by reference herein. Still another way to project ball trajectory is explained in the article "MLBAM introduces new way to analyze every play" found at http://mlb.mlb.com/news/print.jsp?ymd=20140301&content_id=68514514 and incorporated by reference herein.

Using the projected path of the ball, the aerial lighting may be modulated to provide optimum contrast for players observing the flight of the ball. But in this case, rather than dividing the sky into zones and having individual luminaires providing different colors to the those zones, light from one or more RGB LED sources is varied quickly in order to provide optimally contrastive illumination of the ball with optimum contrast against the instantaneous view of the sky as perceived by players, such as e.g. baseball outfielders. This gives the effect of having individual lighting colors for very small zones in the sky, without the costs associated with having multiple drivers. In fact only one driver may be necessary to drive all lights. FIG. 7A-C illustrates the path of a ball across a simplified sky comprising 6 different colored areas 781-786 as it is hit by batter 705 and traverses from home plate 701 to an outfielder 775, and further correlates positions of the ball in space, shown from left to right, with different instances in time, over a period of a few seconds. At T0, the ball is hit by a batter 705 at home plate 701 (ball position 700). At T1 (ball position 710), radar detection marks the first reference point and determines the ball's position in 3 dimensional space. At T2, position 720, radar detection marks the second reference point and determines the ball's second position in 3-dimensional space. The processor then calculates the projected trajectory and correlates times T3-T8 to predicted locations 730, 740, 750, 760, 770, and 780. Based on previous sensor input as discussed herein, sky luminances and colors have already been calculated for the six areas. As the ball follows its projected trajectory, LED RGB light sources change colors to provide the best contrast for outfielder 775. A single set of LED RGB light sources are given color commands by time, and the controller is outputting a particular color command to provide optimum color, as illustrated in FIG. 7C:

T0 (point 700)=(unlit)
T1 (point 710)=(unlit)
T2 (point 720)=(unlit)
T3 (point 730)=(117, 186, 255) ("Blue")
T4 (point 740)=(255, 255, 0) ("Yellow")
T5 (point 750)=(unlit)

T6 (point 760=(153, 204, 255) ("Light Blue")

T7 (point 770=(255, 255, 255) ("White")

T8 (point 780)=unlit

Note that if the aerial lights are simply left off, FIG. 7A, the ball loses contrast over most of its path, except at point 750. Likewise, if the aerial lighting is simply turned on ("White"), FIG. 7B, the ball loses contrast at especially at points 740 and 750. But in FIG. 7C, at each point in the ball's trajectory, it receives illumination that gives it maximum contrast with its background: Blue at 730, Yellow at 740, OFF at 750, Light Blue at 760, White at 770. Certain areas in FIGS. 7A-7C have been hatched to diagrammatically illustrate color as in FIG. 6. Some areas are annotated to indicate color.

In an optional embodiment, instead of providing luminaires which illuminate the entire sky area, it could be possible to use a lesser number of luminaires, on the order of 2-4 luminaires, which are controlled by an actuator which is interfaced with the ball tracking system previously discussed. This would allow following the ball in real time with aerial lighting, which could either be variably colored as previously described, or could be a single color which would still provide potential increase in contrast. The use of fewer luminaires might allow them to have a higher light output without increasing total energy used.

Another optional embodiment comprises modulating luminance of the aerial lighting at a frequency range on the order of e.g. 10-50 Hz to create a "flicker" effect on the ball in the air. This could even be done with UV or near-UV light, either by varying luminance or alternating different UV or near-UV wavelengths. This could be done for the entire time the ball was in the air, or could be timed so that it occurs while the ball is ascending, allowing the fielder to better visually acquire the ball, and it ceases as the ball begins its descent, so as not to interfere with the fielder's judgment of the ball's speed and direction.

Embodiment: Apparatus for Providing Improved Visibility of Ball in the Air at Twilight.

A further embodiment according to aspects of the invention comprises a system and apparatus for providing contrastive aerial lighting on a ball in play. Specifically this embodiment comprises at least one of:

(1) One or more light and color sensors 805, FIG. 8, are pointed towards the sky and used to sense sky color and light intensity. This could be multiple, shielded spectrometers such as the commercially-available Mightex Compact CCD Spectrometer Model HRS-VIS-025 available from Mightex Systems, 2343 Brimley Road, Suite 868, Toronto, Ontario M1S 3L6, Canada. Or it could be one or more color camera(s) such the Marshall V-1258 available from Marshall Electronics, Inc. 1910 E. Maple Avenue, El Segundo, Calif. 90245 pointed towards the sky area above the playing field. A control interface 810 allows input and control of variables such as inputting game time, ball color, whether there is a triggering system such as found in U.S. patent application Ser. No. 14/064,667 (incorporated by reference herein), or whether aerial lighting will be constantly on. Control interface could be local as in a keyboard, keypad, touch screen, etc. Control interface could also be remote 815 (e.g., Control Link™ from Musco (see also U.S. Pat. No. 6,681,110, incorporated by reference), smart phone, etc.). It could be connected through wireless such as wireless IP or Bluetooth®, phone line, internet connection, etc. More than one control interface could be provided.

(2) A processor 820 such as a desktop computer, PLC, dedicated processor, analog op/amp, etc. accepts input from sensors and from the control interface, operates the control program, and communicates with an output interface.

(3) A control program 830 is used to compare inputs against formulas or lookup tables and to store output control or values. One such input is ball spectral reflectance. This could be provided by direct sensor reading from a spectral analyzer 840 such as commercially-available The ASD Inc. Model FieldSpec HandHeld 2 Pro available from PANalytical company d/b/a ASD Inc., 2555 55th Street, Suite 100, Boulder, Colo. 80301.

Figure 9A:
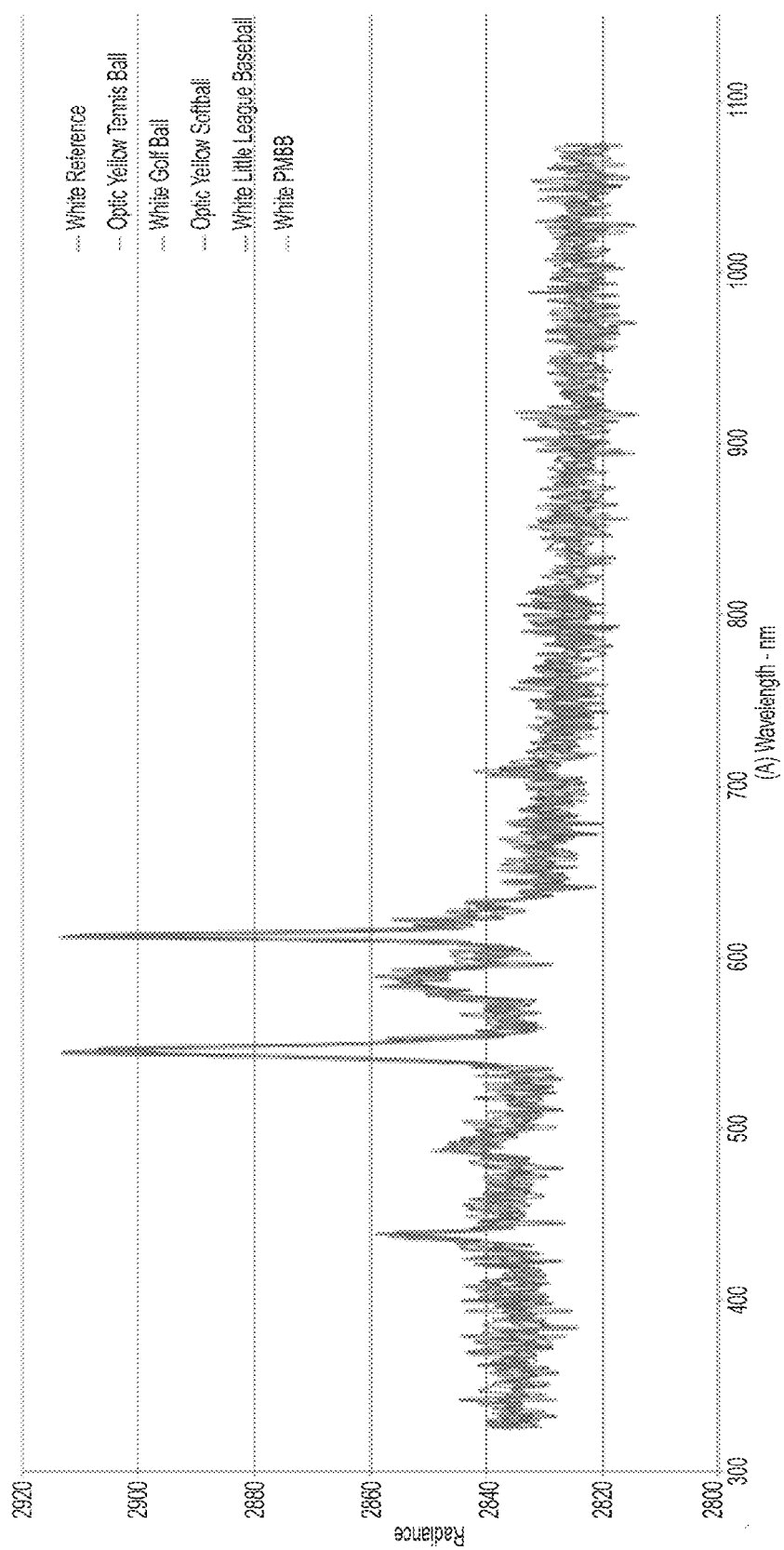
Figure 9B:
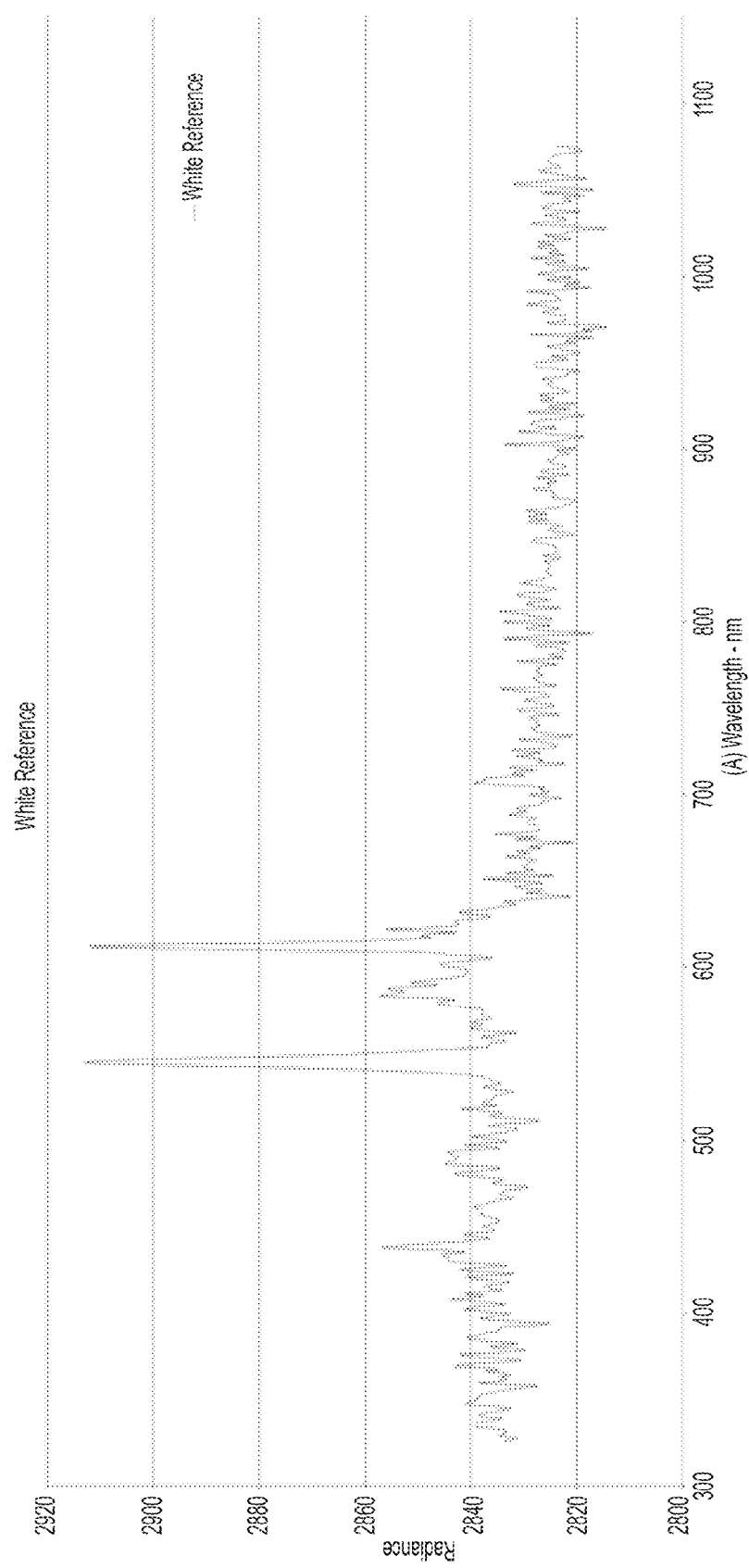
Figure 9C:
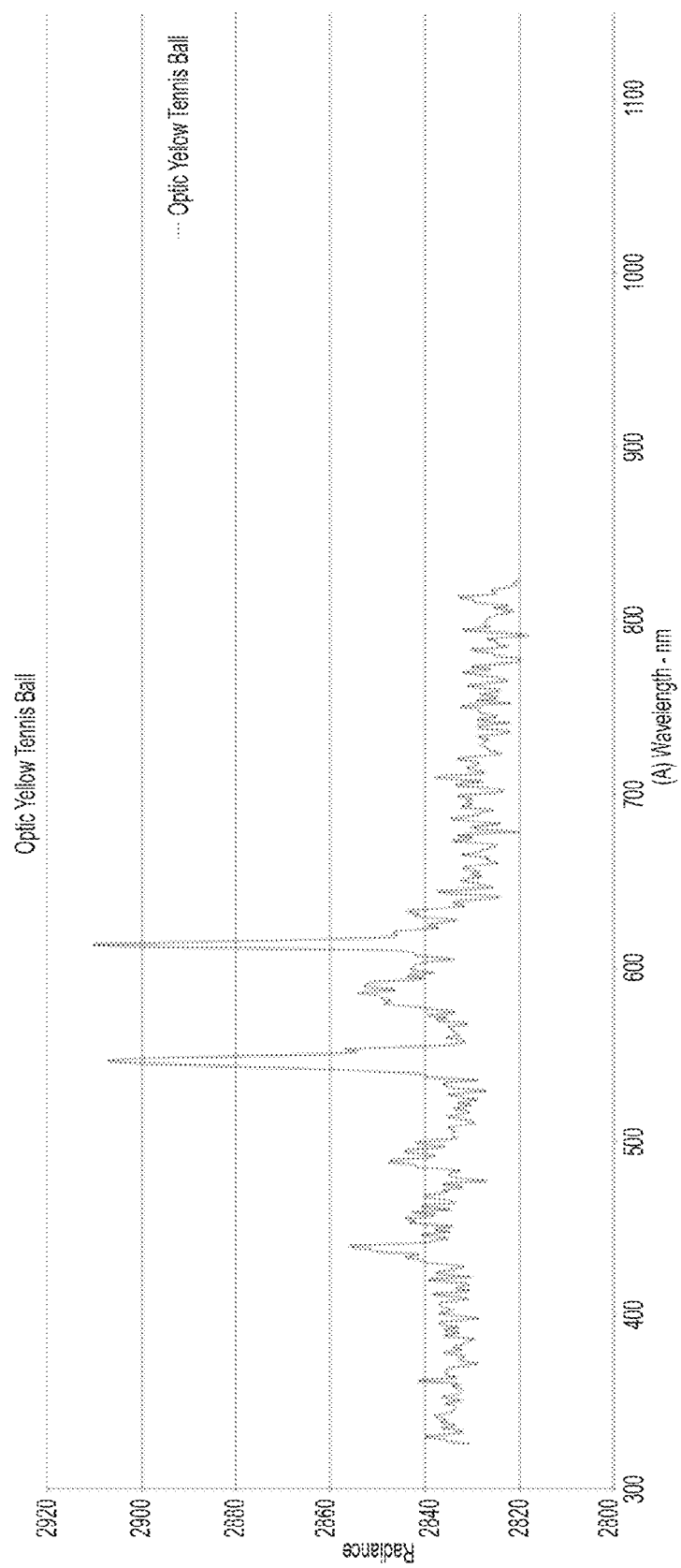
Figure 9E:
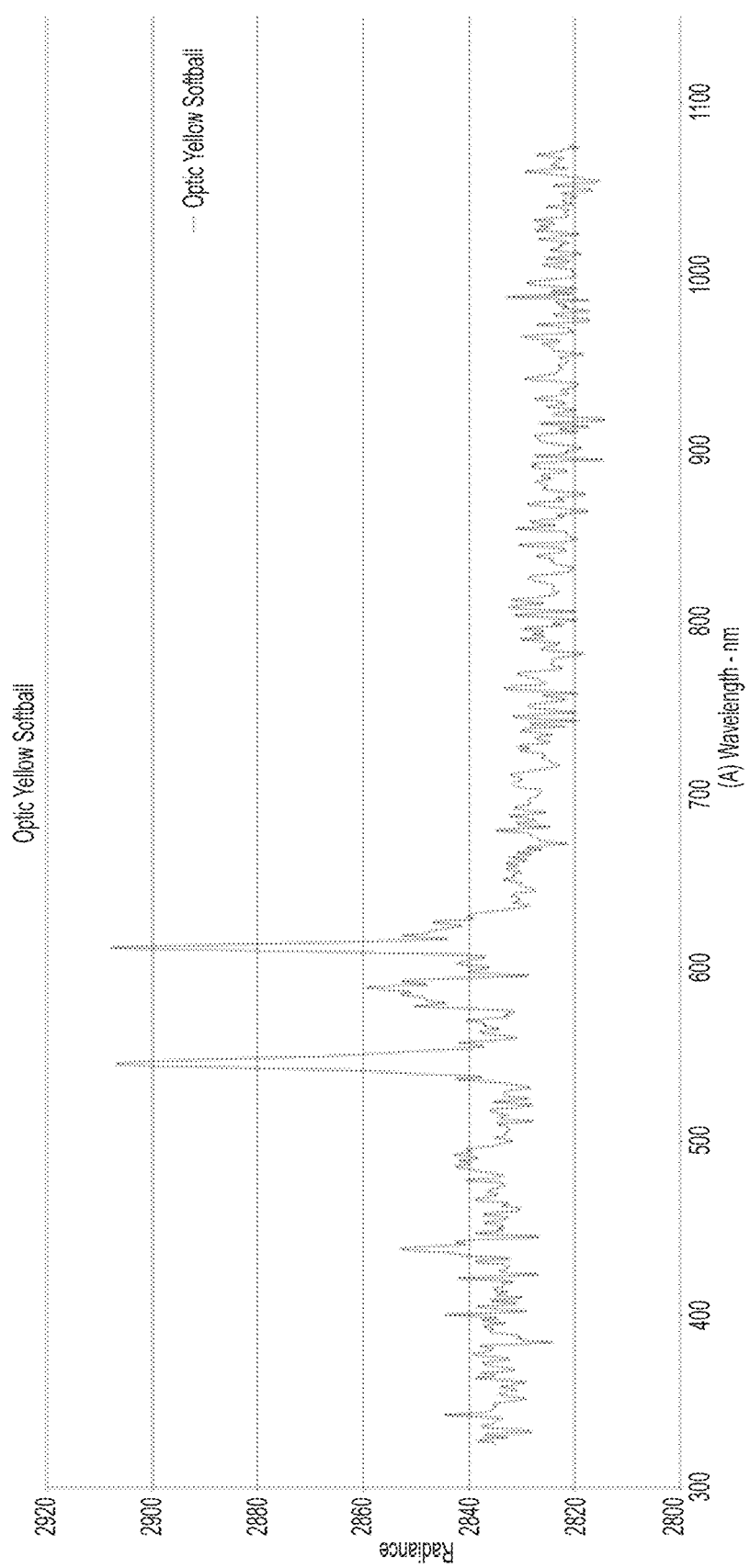

An example of a visual representation of spectral analysis is shown in FIG. 9A-G. In this example, several surfaces from different sports balls, along with a "neutral" white surface were observed outdoors under bright mid-day sunlight. The reflectance from the surfaces was recorded and analyzed, providing a baseline for comparison with other sports balls that might be used. The 'x' axis represents wavelength in nanometers of reflected light from the test surface, and the 'y' axis represents luminance from the surface in W/m^2/sr (Watts per square meter per steradian). The processor would read values as digital or analog signals. Another way to provide ball spectral reflectance is to input known values which have been previously measured, or to input or use a standard value based on estimate of an average or most likely value. FIG. 9A shows each of the six curves overlaid on one another to generally illustrate how they conform to one another. FIGS. 9B-9G illustrate each curve on the same graph scale and axes individually to allow more clarity as to differences.

The control program 830 actively evaluates sky luminance and color values, compares light values to reference values or program algorithms, and determines optimum output values for contrast and playability, including color and luminance, for individual aerial lighting fixtures. These values include threshold values for turning on lights to provide contrast under differing sky conditions. Values could be experimentally measured contrast values, or calculated values based on theoretical considerations. One such light output value could be an RGB specification for one or more individually controllable LED lights. Another such output would be a determination to turn on one white aerial lighting, or to leave aerial lighting off.

(4) An output interface 850, FIG. 8, which could be separate from or a part of processor 820, is used to interface between the controller and the LED driver or control input.

(5) LED Aerial lighting 860 includes a power driver 862 and a luminaire 861 containing multiple LEDs. Drivers may be separate from or integral to luminaires. Drivers may be multi-channel, allowing one driver to control 3 or more sets of color LEDs, or multiple drivers may be used (e.g. one per LED set).

Multiple colored LED luminaires could be such as the commercially-available Philips Vaya Flood MP RGB 20 degree beam model: 316-000008-05. This model includes a driver corresponding to power driver 862, FIG. 8. These luminaires would be mounted relatively low on a structure, particularly relative the field lights.

Options and Alternatives

For embodiments of the invention, sensors could be located in various locations, could exist in various quantities, and could comprise various types. Sensors could comprise color still or video cameras. Or they could comprise sophisticated spectral analyzers, or photocells tuned for a particular range of colors. Or, simple photocells such as Crestron Outdoor Photocell Model GLS-LEXT, available from commercially-available Crestron Electronics, Inc., 15 Volvo Drive, RockLEDgh, N.J. 07647 could provide luminance information. For example, a "white" photocell 870, FIG. 10, could be used in conjunction with a bandpass filter 871 (illustrated diagrammatically) of some type to provide simple readings on the relative intensity of a particular color or range of colors of light. This would allow three separate "white" photocells with color filters to report separate R, G, B readings. The photocells could be shielded in order to read a portion of the sky or field background only, and used in conjunction with other sets of filtered and shielded sensors to provide reports on as many areas of the sky as desired. An example of filters 871 which could be used to provide R, G, B values include the commercially-available Models 10BPF10-570, 10BPF10-530, and 10BPF10-430 bandpass filters which transmit red, green, and blue wavelengths respectively, and which are available from Newport Corporation, 1791 Deere Avenue, Irvine, Calif. 92606.

Light sensors such as 565, FIG. 5, or 130, FIG. 1C, could be mounted on structures as desired, including dedicated structures such as post 566, FIG. 5; or poles 100 Fig. 1C; alternatively they could be integrated into the RGB luminaires such as e.g. 120, FIG. 1C. In that case, given similar optics and positioning as the LEDs in the luminaires, they could report on the same sky that that the luminaires provide light to. Or for cameras having a wide angle input used as light sensors, each pixel would correspond to a different area of the sky. Multiple cameras could be used but for most applications a single camera would likely provide sufficiently wide coverage to characterize any portion of the sky that served as a background to a ball in play.

LED luminaires could be varied according to number, location, and type. For example a single luminaire could contain a mixture of RGB LEDs. Separate R, G, or B fixtures could be used which would be aimed by group so that different colors or color temperatures can be applied to background zones. "LED lights" could also be other light sources that provide instantaneous operation and have a response to varying power levels that can be reliably characterized in order to provide predictable color output. Individually selectable non-variable colored lights, e.g. a choice of yellow, green, blue, red, or white lights could be used, and turned on in any combination. White only, or white plus RGB, or white luminaires in different color temperatures could be used to optimize contrast in accordance with aspects of the invention. UV or near-UV lights could be used by themselves or with other luminaires.

Lighting which illuminates the ball so an outfielder can track it against a sky of a particular background color might not be sufficient for a spectator in the stands to be able to watch the ball in play. Therefore, colored aerial lighting could optionally be provided from multiple directions, which could enhance enjoyment for spectators and players from multiple viewing perspectives. It should be noted however that the round shape of the ball limits the number of directions light aerial light may be added from, since almost 180° of the ball is visible. It is likely that differing color sources of aerial lighting would need to be separated by around 120° or more to avoid mitigating the benefits.

As previously discussed, non-adjustable (i.e. fixed-color temperature) white aerial lighting could be provided, either in addition to the color sets or as a simple embodiment of the invention. In this case, the sky color and luminance, or simply luminance would be monitored, and either an RGB or color temperature output from the colored light set could be specified in addition to an on/off signal for the non-adjustable white light. Or if the aerial lighting was only a non-adjustable white light, the monitoring and control software could still be used to determine when to turn on the aerial lighting for optimum contrast and playability, based on data previously determined for widely ranging conditions.

What is claimed is:

1. A method for improving visibility of an aerial sports object at a sports field against a sky background comprising:
   providing downlighting with elevated downlighting fixtures to a ground zone comprising the sports field and a space above the sports field but below the elevated lighting fixtures, the downlighting fixtures comprising light sources and light redirecting components that:
   provide some direct light to the ground zone;
   provide redirected light to the ground zone;
   substantially completely cut off light outside the ground zone to reduce or eliminate spill light outside the ground zone;
   substantially reduce glare to viewers of the downlighting fixtures both at or outside the sports field;
   providing uplighting with elevated uplighting fixtures to one or more areas of a sky zone above the ground zone at a time and in a manner which increases the visibility of the aerial sports objects against the sky background, the uplighting fixtures comprising light sources and light redirecting components that:
   provide some direct light to the sky zone;
   provide redirected light to the sky zone;
   substantially reduce glare to viewers of the uplighting fixtures both at or outside the sports field; and
   wherein the time of uplighting is correlated to luminance of the sky background; and
   wherein the manner of uplighting is correlated to one or more characteristics of the provided uplighting.

2. The method of claim 1 wherein the time of uplighting is during twilight.

3. The method of claim 2 wherein the increased visibility is provided by either:
   not providing uplighting when doing so would make the luminance of the aerial sports object closer to the luminance of the sky background, or
   by providing uplighting when doing so would make the luminance of the aerial sports object greater than the luminance of the sky background.

4. The method of claim 2 wherein the time of uplighting is after the downlighting is applied to illuminate the sports field.

5. The method of claim 1 wherein the time of uplighting is independent of the application of the downlighting to contribute to less energy usage than if always activated with activation of the downlighting.

6. The method of claim 1 wherein the time of uplighting provides improved contrast of the aerial sports object against the sky background compared to uplighting which commences operation at or near the same time that the downlighting is provided.

7. The method of claim 6 wherein the uplighting does not substantially decrease the visibility of the aerial sports object against the sky background and has an illumination level which is lower than that of the downlighting.

8. The method of claim 1 wherein the aerial sports object comprises a ball and the sports field comprises a ball field correlated to the ball.

9. The method of claim 1 wherein the uplighting is provided by one or more independently controllable fixed color temperature lighting fixtures dedicated at least in part to uplighting and having instant full intensity actuation capability and controlled glare and spill to areas outside the sports field, the light fixtures including solid state light sources.

10. The method of claim 1 wherein the luminance of the sky background is monitored with a light sensor.

11. A method for determining the timing of providing uplighting for a baseball field or other sports field at least partially exposed to the sky comprising:
automatically sensing sky luminance;
providing downlighting with elevated downlighting fixtures to a ground zone comprising the baseball field or other sports field and a space above the sports field but below the elevated lighting fixtures, the downlighting usefully illuminating the ground zone but substantially cutting off light outside the ground zone;
providing an independently and automatically controllable uplighting system with known illuminating capabilities for uplighting when activated, the uplighting directing light to a sky zone above the ground zone but substantially cutting off light outside the ground zone and not materially contributing to glare to viewers on or outside the baseball field or other sports field;
keeping uplighting deactivated during times when the uplighting would reduce contrast of the baseball or other sports object against the sky; and
activating the uplighting when the uplighting would increase contrast of the baseball or other sports object against the sky.

12. The method of claim 11 further comprising:
using a monitoring apparatus for automatic sensing of the sky luminance;
using one or more uplights which illuminate an area or areas in the sky zone above the baseball field or other sports field for the uplighting;
using a control apparatus in communication with the monitoring apparatus and the uplights which activates the uplights for the uplighting.

13. The method of claim 12 wherein the monitoring apparatus to sense sky luminance detects intensity or spectral distribution of the sky luminance.

14. The method of claim 12 wherein the one or more uplights provide variable illumination to different areas of the sky in conjunction with sensed or predicted trajectory of an aerial baseball or other sports object.

15. The method of claim 12 wherein the one or more uplights are configured to provide differing intensity or spectral distribution in response to the sky luminance.

16. The method of claim 12 wherein the monitoring apparatus comprises a photosensor.

17. The method of claim 12 wherein the monitoring apparatus comprises a digital camera.

18. A method of providing uplighting for a sports field at least partially exposed to the sky wherein the uplighting has an intensity and spectral distribution comprising:
calibrating at least one of the intensity or spectral distribution of the uplighting to improve contrast or visibility of a sports object used at the sports field against the sky; and
automatically controlling activation of the calibrated uplighting based on a predetermined event or condition; and
wherein the intensity or spectral distribution of the uplighting is vaired according to a trajectory of the sports object in comparison with one or more factors relating to sky color, sky luminance, and position of a player or players on the sports field.

19. The method of claim 18 wherein the spectral distribution of uplighting is varied to provide improved contrast against multiple areas of the sky with reference to the position of a player or players on the sports field.

20. A system for providing uplighting for a baseball or other sports field and improved visibility of an aerial baseball or other sports object compared with conventional systems for uplighting, comprising:
a sensing apparatus to sense sky luminance at or around the baseball or other sports field;
one or more uplights configured to illuminate an area or areas above the baseball or other sports field without materially contributing to:
spill light outside the baseball or other sports field or glare to viewers on or outside the baseball or other sports field;
a control apparatus operatively connected to the sensing apparatus and the one or more uplights to automatically control turn on of the uplighting according to the sky luminance sensed by the sensing apparatus.

21. The system of claim 20 wherein the sensing apparatus is configured to detect intensity or spectral distribution of the sky luminance.

22. The system of claim 20 wherein the one or more uplights are configured to provide variable illumination to different areas above the baseball or other sports field in conjunction with a determined trajectory of an aerial baseball or other sports object.

23. The system of claim 22 wherein the one or more uplights are configured to provide differing intensity or spectral distribution in response to the sensed sky luminance.

24. The system of claim 20 wherein the sensing apparatus to sense sky luminance comprises a photosensor.

25. The system of claim 20 wherein the sensing apparatus to sense sky luminance comprises a digital camera.

* * * * *

UNITED STATES PATENT AND TRADEMARK OFFICE
CERTIFICATE OF CORRECTION

| | | |
|---|---|---|
| PATENT NO. | : 9,706,622 B2 | Page 1 of 1 |
| APPLICATION NO. | : 14/712485 | |
| DATED | : July 11, 2017 | |
| INVENTOR(S) | : Myron Gordin et al. | |

It is certified that error appears in the above-identified patent and that said Letters Patent is hereby corrected as shown below:

In the Claims

In Column 24, Claim 18, Line 12:
INSERT --varied-- before the word according

In Column 24, Claim 18, Line 12:
DELETE "vaired" which occurs before the word according Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*